(12) United States Patent
Sonagra et al.

(10) Patent No.: US 12,394,578 B2
(45) Date of Patent: Aug. 19, 2025

(54) DETERMINATION OF ELECTRICAL MAKING INSTANTS USING LOAD VOLTAGE FOR COUPLED LOADS

(71) Applicant: Hitachi Energy Ltd, Zürich (CH)

(72) Inventors: Mehulbhai Ghanshyambhai Sonagra, Gujarat (IN); Urmil Parikh, Ludvika (SE); Michael Stanek, Gebenstorf (CH)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/565,840

(22) PCT Filed: May 24, 2022

(86) PCT No.: PCT/EP2022/064135
§ 371 (c)(1),
(2) Date: Nov. 30, 2023

(87) PCT Pub. No.: WO2022/253653
PCT Pub. Date: Dec. 8, 2022

(65) Prior Publication Data
US 2024/0258046 A1 Aug. 1, 2024

(30) Foreign Application Priority Data

Jun. 4, 2021 (IN) .............................. 202121025032

(51) Int. Cl.
*H01H 33/59* (2006.01)
*H01H 9/54* (2006.01)

(52) U.S. Cl.
CPC .................................... *H01H 9/54* (2013.01)

(58) Field of Classification Search
CPC ...................................................... H01H 9/54
See application file for complete search history.

(56) References Cited

U.S. PATENT DOCUMENTS 10,778,101 B1 *  9/2020  Schmitz .............. H02M 3/1584
11,863,069 B2 *  1/2024  Sareen .................. H02M 3/158
(Continued)

FOREIGN PATENT DOCUMENTS

| JP | 2001-135205 A | 5/2001 | |
|---|---|---|---|
| WO | 2011125210 A1 | 10/2011 | |
| WO | WO-2020136545 A1 * | 7/2020 | ............. G01R 15/14 |

OTHER PUBLICATIONS

International Search Report and Written Opinion, International Application No. PCT/EP2022/064135, mailed Sep. 30, 2022, 15 pages.

(Continued)

*Primary Examiner* — Jared Fureman
*Assistant Examiner* — Esayas G Yeshaw
(74) *Attorney, Agent, or Firm* — Sage Patent Group

(57) ABSTRACT

A method to detect an electrical making instant for a coupled load is provided. A measured terminal voltage is obtained for each phase of one or more phases of an electrical equipment from a voltage measuring device, during an energization operation of the electrical equipment through a switching device. Further, circuit configuration parameters associated with the electrical equipment is obtained. A processed voltage is determined, for the one or more phases of the electrical equipment based on one or more of the measured terminal voltages of the electrical equipment and a mapping table, which comprises a mapping between the circuit configuration parameters and a computation to be performed on the measured terminal voltage(s). An electrical making instant of a pole of the switching device associated with a phase of the one or more phases is determined based on the processed voltage for monitoring the energization operation of the electrical equipment.

14 Claims, 10 Drawing Sheets

(56) References Cited

U.S. PATENT DOCUMENTS

2007/0252599 A1* 11/2007 Zhou ............... H01H 9/563
    324/424
2022/0337162 A1* 10/2022 Shen ............... H02M 3/156
2023/0187963 A1* 6/2023 Zhang ............. H02J 7/00712
    307/64
2023/0347872 A1* 11/2023 Gesang ............ B60L 7/18

OTHER PUBLICATIONS

Japanese Office Action, Japanese Patent Application No. 2023-574654, mailed Dec. 10, 2024, 5 pages.

\* cited by examiner

DETERMINATION OF ELECTRICAL MAKING INSTANTS USING LOAD VOLTAGE FOR COUPLED LOADS

CROSS-REFERENCE TO RELATED APPLICATIONS

This application is a 35 U.S.C. § 371 national stage application of PCT International Application No. PCT/EP2022/064135 filed on May 24, 2022, which in turn claims priority to Indian Patent Application No. 202121025032, filed on Jun. 4, 2023, the disclosures and content of which are incorporated by reference herein in their entireties.

TECHNICAL FIELD

The present subject matter relates, in general, to determination of electrical making instants. In particular, the present subject matter relates to determination of electrical making instants using load voltage for coupled loads.

BACKGROUND

Switching devices, such as circuit breakers, are commonly used in power systems for controlled switching of electrical equipment, such as transformers, reactor banks, or capacitor banks. During operation of power systems, electrical equipment may be switched on and off using circuit breakers connected thereto. The switching on and switching off of the electrical equipment may be referred to as energization and de-energization, respectively. Energization and de-energization of electrical equipment is performed on considering various factors, such as load variation, fault detection, and the like. One phase of the electrical equipment may be coupled to another phase of the electrical equipment electrically, magnetically, or both. The instant at which the circuit breaker contacts engage or close, and a current signal is generated for energization of the electrical equipment, may be referred to as the electrical making instant of the circuit breaker. A controlled switching device (CSD) may compare an actual electrical making instant with a corresponding target electrical making instant and based on the comparison, optimizes the operation time of the circuit breaker for the subsequent energization. This process of adaptive correction compensates for systematic changes such as operating variations due to the effect of aging, wear and tear of contacts, variation in gas pressure, and the like that may affect the circuit breaker's operation characteristics.

SUMMARY

Embodiments of the present disclosure provide a method for determining an electrical making instant of the switching device, such as a circuit breaker, for energization of an electrical equipment. The determination of the actual instant of operation of the circuit breaker to energize the electrical equipment may be referred to as an electrical making instant. A device for determining an electrical making instant of the switching device for controlled switching and monitoring an energization operation of a coupled load is provided, and a computer readable storage medium comprising instructions for determining an electrical making instant of the switching device for controlled switching and monitoring an energization operation of a coupled load is provided. Objectives of embodiments of the present disclosure include accurate evaluation of actual electrical making instants for more than one phase of coupled loads, to facilitate optimized controlled switching and monitoring an energization operation of the coupled loads. The embodiments of the present disclosure provide a fast and simple approach for detecting electrical making instants based on terminal voltage measurements.

According to a first aspect, a method for determining an electrical making instant of a switching device for monitoring an energization operation of the electrical equipment is provided. The method comprises obtaining a measured terminal voltage of each phase of one or more phases of an electrical equipment from a voltage measuring device, during an energization operation of the electrical equipment through a switching device, where the phases of the electrical equipment are electrically or magnetically coupled to each other. Additionally, circuit configuration parameters associated with the electrical equipment are obtained. Further, a processed voltage is determined for the one or more phases of the electrical equipment based on one or more of the measured terminal voltages of the electrical equipment and a mapping table. The mapping table comprises a mapping between the circuit configuration parameters and a computation to be performed on one or more of the measured terminal voltages to determine the processed voltages. Based on the processed voltage, an electrical making instant of a pole of the switching device associated with a phase of the one or more phases is determined for monitoring the energization operation of the electrical equipment.

According to a second aspect, a device connected to a switching device and comprising a processor is provided, where the processor is configured to obtain a measured terminal voltage of each phase of one or more phases of an electrical equipment from a voltage measuring device, during an energization operation of the electrical equipment through the switching device, where the phases of the electrical equipment are electrically or magnetically coupled to each other. Additionally, circuit configuration parameters associated with the electrical equipment are obtained. Further, a processed voltage is determined for one or more phases of the electrical equipment based on one or more of the measured terminal voltages of the electrical equipment and a mapping table. The mapping table comprises a mapping between the circuit configuration parameters and a computation to be performed on one or more of the measured terminal voltages to determine the processed voltages. Based on the processed voltage, an electrical making instant of a pole of the switching device associated with a phase of the one or more phases is determined for monitoring the energization operation of the electrical equipment.

According to an implementation, monitoring the energization operation of the electrical equipment includes evaluating a making time based on the determined electrical making instant of the pole of the switching device during the energization operation. Further, the making time is compared with an expected making time for the circuit configuration parameters to determine an error. Based on the determined error, a correction is applied to a closing time of the pole of the switching device to improve performance of a subsequent energization operation.

According to an implementation, when the electrical equipment is inductive having a magnetic circuit, the step of determining the processed voltage includes determining a winding voltage, where the winding voltage creates a flux that links to each phase of the electrical equipment.

According to an implementation, when the electrical equipment is a capacitor bank, the step of determining the processed voltage includes determining a voltage across an equivalent capacitance for each phase of the electrical equipment.

According to an implementation, the measured terminal voltage for each phase is obtained from the voltage measuring device connected on a load side of the switching device.

According to an implementation, the electrical making instant of the pole of the switching device is determined as an instant corresponding to a start of a rising slope of the processed voltage, when the rising slope crosses a pre-determined phase-wise threshold value to reach a first voltage peak.

According to an implementation, the pre-determined phase-wise threshold value corresponds to one or more of a noise, an interference, or a sub-property the electrical equipment.

According to an implementation, the circuit configuration parameters includes one or more of a connection configuration of a voltage measuring device, a position of the voltage measuring device, a type of the voltage measuring device, design characteristics of the electrical equipment, number of windings and their connection configuration, a type of winding configuration on which the controlled switching is performed, and a switching sequence of the electrical equipment.

According to an implementation, the measured terminal voltage of any one phase of the one or more phases or any two phases of the one or more phases is used to determine the processed voltage to detect the electrical making instant of the pole of the switching device associated with any other phase of the one or more phases based on the mapping table.

According to an implementation, the electrical equipment is any one of a transformer, a delta connected or ungrounded capacitor bank, a delta connected or ungrounded non-magnetically coupled reactor, or a magnetically coupled reactor.

BRIEF DESCRIPTION OF DRAWINGS

The features, aspects, and advantages of the present subject matter will be better understood with regard to the following description and accompanying figures. The use of the same reference number in different figures indicates similar or identical features and components.

DETAILED DESCRIPTION

Figure 1:
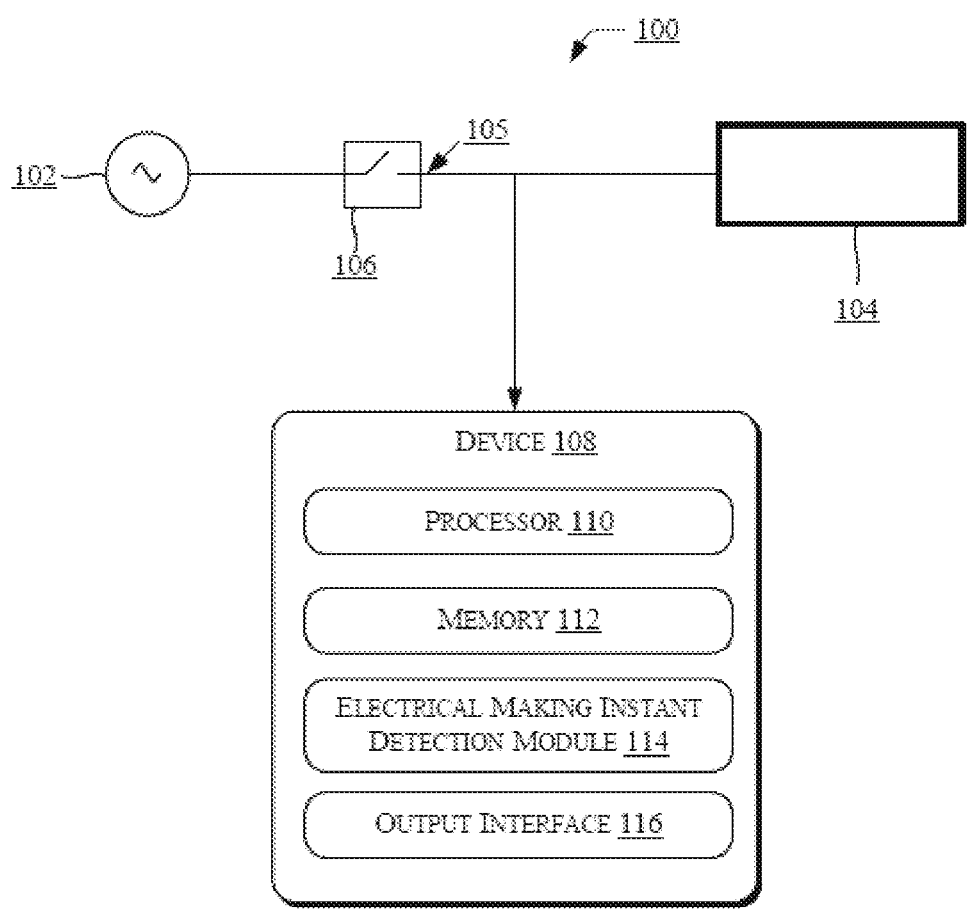
FIG. 1 illustrates a block diagram for monitoring the energization operation of an electrical equipment, in accordance with an embodiment of the present subject matter.

The present subject matter relates to determining an electrical making instant of a switching device. The following describes determining an electrical making instant of the switching device for monitoring energization operation of coupled loads. The switching device has been alternatively referred to as a circuit breaker, hereinafter. The instant of operation of the contacts of the circuit breaker, in response to a closing command, is defined as the electrical making instant of the circuit breaker. In one example, each pole of the circuit breaker may be associated with a phase of the electrical equipment. For the sake of discussion, the coupled load referred to herein, may be an electrical equipment. The electrical equipment may have one or more phases that are coupled magnetically, electrically, or both. For example, an electrical equipment with a delta connection or an ungrounded neutral connection is considered to be electrically coupled and an electrical equipment with a three-limb core is considered to be magnetically coupled.

In one technique, a current feedback signal is used to determine the electrical making instant of the circuit breaker. This technique, in general, would be applicable to electrical equipment such as a reactor bank or a capacitor bank. In another technique, a load voltage signal is used to determine the electrical making instant of the circuit breaker. For electrical equipment such as a transformer, or for transmission line applications, the load voltage signal is used to determine the electrical making instants.

In electrical equipment, where one or more phases are electrically or magnetically coupled, when a first pole of the circuit breaker associated with a first phase of the electrical equipment is closed, a load voltage appears in more than one phase associated with the electrical equipment. This is undesirable, as determining the electrical making instant for each phase of the electrical equipment becomes a challenge. Thus, distinguishing the individual electrical making instants for each phase of the electrical equipment may be a challenge. For electrical equipment such as a transformer, the optimum switching instant for each phase of the transformer can be determined from a transformer core residual flux pattern. For transformers, the measurement of the transformer terminal voltage and the mathematical integration of the winding voltages may be performed to determine the transformer core residual flux pattern. Based on the residual flux obtained from the direct load voltage, the optimum electrical making instant may be determined. Detecting individual electrical making instants from a direct load voltage signal may result in an erroneous detection of making instants for electrically and/or magnetically coupled loads.

The present subject matter provides methods and devices for determining the electrical making instants for more than one phase of the electrical equipment by determining a processed voltage based on one or more of the measured terminal voltages and a mapping table. The electrical making instant of a switching device, such as a circuit breaker, may be utilized to monitor the energization operation of the electrical equipment. The electrical equipment may be coupled electrically, magnetically, or both. Although principles of the present subject matter have been predominantly discussed with respect to a transformer as the electrical equipment, the same principles are applicable to other electrical equipment, such as capacitor banks, reactor banks, and the like, where phases of the electrical equipment may be coupled to one another.

In operation, in one example, a measured terminal voltage is obtained for each phase of one or more phases of an electrical equipment from a voltage measuring device, during an energization operation of the electrical equipment through a switching device, where the phases of the electrical equipment are electrically or magnetically coupled to each other. Further, circuit configuration parameters associated with the electrical equipment are obtained. Based on one or more of the measured terminal voltages of the electrical equipment and a mapping table, a processed voltage is determined for the one or more phases of the electrical equipment. Further, based on the processed voltage, an electrical making instant of a pole of the switching device associated with a phase of the one or more phases is determined for monitoring the energization operation of the electrical equipment.

The present subject matter thus provides for an accurate determination of electrical making instant for fast and optimized controlled switching of coupled loads, by distinguishing the individual electrical making instants for each phase of the electrical equipment from a processed voltage. The present subject matter provides a fast and simple approach to detect the electrical making instants for individual phases of the electrical equipment with high reliability for monitoring the energization operation of the electrical equipment to improve performance of a subsequent energization operation.

The above and other features, aspects, and advantages of the subject matter will be better explained with regard to the following description and accompanying figures. Wherever possible, the same reference numbers are used in the drawings and the following description to refer to the same or similar parts. While several examples are described, modifications, adaptations, and other implementations are possible.

FIG. 1 illustrates a block diagram for monitoring the energization operation of an electrical equipment, in accordance with an embodiment of the present subject matter. An electrical network 100, may be for example, a three-phase electrical network. The electrical network 100 comprises an electrical source 102 that supplies power to the three phases of the network 100. In one example, the electrical source 102 may be a power generator, such as a synchronous power generator, an inverter-based source, or a busbar source. The electrical equipment 104 may be a coupled load, i.e., an electrical equipment in which the one or more phases of the electrical equipment are coupled to each other electrically or magnetically. In one example, the electrical equipment 104 may be an electrically and/or magnetically coupled transformer, a delta connected capacitor bank, an ungrounded capacitor bank, a delta connected reactor, an ungrounded non-magnetically coupled reactor, or a magnetically coupled reactor. The electrical equipment 104 may be connected to a load side 105 of a switching device 106, such as a circuit breaker 106. Each pole of the circuit breaker 106 may be associated with a phase of the electrical equipment 104.

It will be understood that that the electrical network 100 may include a plurality of additional components or devices for monitoring, sensing, and controlling various parameters that may be associated with the network but are not shown for brevity. For example, components such as additional circuit breakers, sensors, current transformers, voltage transformers, loads connected to the transmission lines, shunt reactors, intelligent electronic devices (IEDs), protective relays, and the like may be connected to the network.

A device 108 may receive voltage measurements associated with the electrical equipment 104. In one example, the device 108 may be an IED. In other examples, the device 108 may be any computing device, such as a server, a desktop device, a laptop, etc., which may receive the measurements from an IED. In one example, the device 108 may be connected to the switching device. In another example, the device 108 may be a part of the switching device. In one example, a signal may be directly applied to the switching device 106, to switch on (close) or off (open), the switching device. The switching on or off of the circuit breaker may be used for controlled switching of the electrical equipment 104.

In an example, the present subject matter may be implemented by one or more modules. The modules may be implemented as instructions executable by one or more processors. For instance, in the example where the device 108 performs the method for determining the electrical making instants of the circuit breaker for a coupled load, the modules are executed by a processor of the device 108. In case the method is implemented in part by the device 108 and in part by a server, the modules (depending on the step) will be distributed accordingly between the device 108 and the server.

In one example, the device 108 may be configured to receive input measurement signals from various measurement equipment connected to the electrical network 100, such as current transformers, potential transformers, Rogowski coils, or other measurement sensors. In one example, the device 108 may be configured to obtain a measured terminal voltage of the electrical equipment 104 from a voltage measuring device (not shown in the figure). The device 108 may process the voltage measurements obtained with the help of a processor 110. The processor 110 may be implemented as a dedicated processor, a shared processor, or a plurality of individual processors, some of which may be shared, some of which may be on the device 108 and others may be on another device. The device 108 may comprise a memory 112, that may be communicatively connected to the processor 110. Among other capabilities, the processor 110 may fetch and execute computer-readable instructions, stored in the memory 112. In one example, the memory 112 may store instructions that can be executed by the processor 110 to implement an electrical making instant detection module 114 alternatively referred to as EMID module 114. In other examples, instructions to implement the EMID module 114 may be stored in a memory outside of the device 108 in an external memory. The memory 112 may include any non-transitory computer-readable medium including, for example, volatile memory, such as RAM, or non-volatile memory, such as EPROM, flash memory, and the like.

In one example, a method to determine an electrical making instant of a circuit breaker 106 for monitoring the energization operation of the electrical equipment 104 may be performed by the processor 110 by implementing the EMID module 114. For the determination, a measured terminal voltage may be obtained for each phase of the electrical equipment 104. In one example, the measured terminal voltage for each phase may be obtained from a voltage measuring device connected on the load side 105 of the circuit breaker 106, during an energization operation of the electrical equipment 104, where the electrical equipment 104 is energized through the circuit breaker 106. On obtaining the measured terminal voltages, the device 108 may obtain circuit configuration parameters associated with the electrical equipment 104. In one example, the circuit configuration parameters may be obtained from a user. In another example, the circuit configuration parameters may be obtained from an external device.

The source 102, the circuit breaker 106, the electrical equipment 104 and the measuring devices (not shown in the figure) comprise a circuit. The circuit configuration parameters may include one or more of a connection configuration of a voltage measuring device, a position of the voltage measuring device, the type of voltage measuring device, design characteristics of the electrical equipment, number of windings and their connection configuration, a type of electrical equipment on which the controlled switching is to be performed, a switching sequence of the electrical equipment, and the like. The connection configuration of the voltage measuring device may refer to how the windings of the voltage measuring device are connected. For example, the connection configuration of the voltage measuring device may indicate that the voltage measuring device is a star-grounded, or delta connected potential transformer. The position of the voltage measuring device refers to the side of the electrical equipment on which the voltage measuring device is connected. For example, if the electrical equipment is a star-delta transformer, then the position of the voltage measuring device may refer to the voltage measuring device being connected on the star side of the transformer, or the delta side of the transformer. The design characteristics of the electrical equipment, such as a transformer, may include a core design of the transformer, how the delta connection on the winding is formed, and the like. The switching sequence refers to the order in which the poles of the circuit breaker associated with phases of the electrical equipment are closed. The characteristics of electrical equipment 104 on which the controlled switching is to be performed may be, for example, a transformer, a capacitor bank, or a reactor bank and connection configuration of all windings of electrical equipment.

On obtaining the measured terminal voltages and the circuit configuration parameters, the device 108 may determine a processed voltage for the one or more phases of the electrical equipment 104. The processed voltage may be any one of the measured terminal voltages or may be obtained based on one or more measured terminal voltages.

In one example, when the electrical equipment 104 is inductive having a magnetic circuit, the step of determining the processed voltage may be performed by determining a winding voltage, where the winding voltage creates a flux that links to each phase of the electrical equipment 104. In yet another example, when the electrical equipment 104 is a capacitor bank, the step of determining the processed voltage may be performed by determining a voltage across an equivalent capacitance for each phase of the electrical equipment 104.

To determine the processed voltage from the measured terminal voltages for the circuit configuration parameters obtained, a mapping table may be used. The mapping table may comprise a mapping between the circuit configuration parameters and the computation to be performed on the measured terminal voltages to obtain the processed voltages. In one example, the mapping table may be determined theoretically through circuit analysis. In one example, the mapping table may be stored in the memory 112. In another example, the mapping table may be stored in an external memory which may be accessed by the device 108. In one example, the mapping table may be pre-configured in the device 108. Table 1 shown below represents an example mapping table for example circuit configurations where the electrical equipment is a transformer. It will be understood that the mapping table can be similarly populated for other circuit configurations as well. Further, the principles can be extended to any electrical equipment with electrical coupling, magnetic coupling, or both electrical and magnetic coupling. For example, the principles may be extended to delta connected capacitor banks, where one or more phases are electrically coupled to each other, or for three limb reactors with magnetic coupling.

Table 1 depicts a mapping between a transformer switching winding configuration and the computation to be performed on a winding voltage for determining the processed voltage. The measured terminal voltages may be obtained for each phase of the transformer. The winding voltage may be derived from the measured terminal voltage based on a connection type of voltage measurement, position of voltage measurement, and connection configuration of the winding of the electrical equipment from which voltage measurement is taken. The winding voltages remain the same for a given transformer configuration, irrespective of side on which the measured terminal voltage is obtained on and irrespective of the configuration of the voltage measuring device.

TABLE 1

AN EXAMPLE OF A MAPPING TABLE

| Sl. no | Transformer switching winding configuration | Processed voltage for the switching instant detection for the L1-L3-L2 switching sequence | | |
|---|---|---|---|---|
| | | L1 | L2 | L3 |
| 1 | Yn | (Vw1 − Vw2) / sqrt (3) | Need not be evaluated | (Vw2 − Vw3) / sqrt (3) |
| 2 | Y | Need not be evaluated | Vw2 | Vw3 |
| 3 | D1 | Need not be evaluated | (Vw1 − Vw2) / sqrt (3) | (Vw3 − Vw1) / sqrt (3) |
| 4 | D11 | Need not be evaluated | (Vw2 − Vw3) / sqrt (3) | (Vw3 − Vw1) / sqrt (3) |
| 5 | D7 | Need not be evaluated | (Vw1 − Vw2) / sqrt (3) | (Vw3 − Vw1) / sqrt (3) |
| 6 | D5 | Need not be evaluated | (Vw2 − Vw3) / sort (3) | (Vw3 − Vw1) / sqrt (3) |
| 7 | Zn1 | Vw1 | Need not be evaluated | Vw2 |
| 8 | Zn11 | Vw1 | Need not be evaluated | Vw3 |

Table 1 represents a list of transformer switching winding configurations. The transformer switching winding configuration represents the winding configuration of the side from which the transformer is energized. Table 1 represents a few example transformer switching configurations, where Yn represents a star-ground winding configuration, Y represents a star-ungrounded winding configuration, D1 represents delta configuration in which the voltage at the terminal of the side from which the transformer is energized for each phase lags the winding voltage by 30 degrees, D11 represents delta winding configuration in which the voltage at the terminal of the side from which the transformer is energized for each phase leads the winding voltage by 30 degrees, D5 represents delta winding configuration in which the voltage at the terminal of the side from which the transformer is energized for each phase lags the winding voltage by 150 degrees, D7 represents delta winding configuration in which the voltage at the terminal of the side from which the transformer is energized for each phase leads the winding voltage by 150 degrees, Zn1 represents zig-zag-grounded winding configuration in which the voltage at the terminal of the side from which the transformer is energized for each phase lags the winding voltage by 30 degrees, Zn11 represents zig-zag grounded winding configuration in which the voltage at the terminal of the side from which the transformer is energized for each phase leads the winding voltage by 30 degrees.

Further, Table 1 represents a switching sequence of L1-L3-L2. In a switching sequence of L1-L3-L2, L1 may correspond to a first pole of the circuit breaker associated with a first phase of the transformer referred to as a first switching phase L1, L3 may correspond to a third pole of the circuit breaker associated with a third phase of the transformer referred to as a second switching phase L3, and L2 may correspond to a second pole of the circuit breaker associated with a second phase of the transformer, referred to as a third switching phase L2. Therefore, the switching sequence L1-L3-L2 corresponds to energizing the phases of the electrical equipment in the order of 1-3-2, by closing a pole of the circuit breaker associated with that phase.

To determine the processed voltage, the device 108 may obtain the measured terminal voltages and the circuit configuration parameters. In one example, the circuit configuration parameters include details such as the side of energization of the transformer and the switching sequence for energization to be followed. Based on the circuit configuration parameters obtained, the device 108 may determine the processed voltage based on the mapping table (refer Table 1 for this example).

Based on the mapping relation that is provided in Table 1, from the first row, it may be understood that for a transformer that is energized from a star-ground side, and when the switching sequence to be followed is L1-L3-L2, the processed voltages may be determined for the first switching phase L1 and the second switching phase L3 as explained below:

The processed voltage for the first switching phase L1 of the transformer, may be determined as depicted in equation (1) shown below:

$$Vp1 = (Vw1 - Vw2)/sqrt(3) \qquad (1)$$

where Vp1 is the processed voltage for the first switching phase L1 of the transformer, Vw1 and Vw2 are the winding voltages of the first switching phase and the third switching phase of the transformer respectively. The winding voltages Vw1 and Vw2 may be computed from the measured terminal voltages of the one or more phases of the transformer, based on the mapping table. In one example, the winding voltage may be based on a connection configuration of a voltage measuring device and the type of transformer winding connection from where the measured terminal voltages are obtained. In one example, the winding voltage may be the same as the measured terminal voltage. In another example, the winding voltage may be the measured terminal voltages of any one phase or a combination of the phases of the transformer.

Similarly, the processed voltage for the second switching phase L3 of the transformer may be determined as depicted in equation (2) shown below:

$$Vp3 = (Vw2 - Vw3)/sqrt(3) \qquad (2)$$

where Vp3 is the processed voltage for the second switching phase L3 of the transformer, and Vw3 is the winding voltage of the second switching phase L3. In this example, it may be irrelevant to determine the electrical making instant for the third switching phase L2, as, on energizing the first switching phase L1 at a first time instant and the second switching phase L3 at a second time instant, the resultant flux for the third pole L2 will be locked.

Considering another example, for the circuit configuration parameter details, such as the transformer being energized from a star-ungrounded side, and the switching sequence for energization to be followed is L1-L3-L2, the second row of Table 1 may be referred, to determine the processed voltages. Table 1 depicts that for a transformer that is energized from a star-ungrounded side, with a switching sequence of L1-L3-L2, the processed voltages may be determined for the third switching phase L2 and the second switching phase L3. The processed voltage for the third switching phase L2 of the transformer, may be determined as depicted in equation (3) shown below:

$$Vp2 = Vw2 \quad (3)$$

Where Vp2 is the processed voltage for the third switching phase L2 of the transformer. Similarly, the processed voltage for the second switching phase L3 of the transformer may be determined as depicted in equation (4) shown below:

$$Vp3 = Vw3 \quad (4)$$

Where Vp3 is the processed voltage for the second switching phase L3 of the transformer and Vw3 is the winding voltage of the second switching phase of the transformer L2

The processed voltage may further be used to determine an electrical making instant of a pole of the switching device associated with a phase of the electrical equipment 104. In one example, the electrical making instant of the pole of the switching device may be determined as an instant corresponding to a start of a rising slope of the processed voltage, where the rising slope crosses a pre-determined phase-wise threshold value to reach a first voltage peak. In one example, the pre-determined phase-wise threshold value corresponds to one or more of a noise, an interference, or a sub-property of the electrical equipment. The sub-property of the electrical equipment may refer to design properties of the electrical equipment, such as unequal magnetic flux path length in the case of a three-limb core design transformer, or unequal magnetic flux path length in the case of a reactor.

The electrical making instant of the pole of the switching device may be determined for monitoring the energization operation of the electrical equipment 104. In one example, the device 108 performs monitoring of the energization operation of the electrical equipment 104 includes evaluating a making time which is based on the determined electrical making instant of the pole of the switching device evaluated during the energization operation. The making time of the pole of the switching device is the time from when the switching device receives a closing command till the circuit is detected to be closed electrically through the determined electrical making instant. The evaluated making time may be compared to an expected making time for the circuit configuration parameters obtained, to determine an error. Based on the error, a correction may be applied to a current closing time of the pole of the switching device to determine a closing time for a subsequent operation and achieve an improvement in switching performance of a subsequent energization operation.

Further, the device 108 may comprise an output interface 116 to communicate the results obtained from the electrical making instant determination module 114, for example, to a server. The output interface 116 may include a variety of computer-readable instructions-based interfaces and hardware interfaces that allow interaction with other communication, storage, and computing devices, such as network entities, web servers, databases, and external repositories, and peripheral devices. In one example, the electrical making instant values, the energization targets, voltage and current measurements, and the like may be viewed on a display (not shown in the figure) connected to the output interface 116 or integrated with the device 108.

Thus, the present subject matter facilitates accurate determination of an electrical making instant for monitoring the energization operation of coupled loads. Various example scenarios, where the teachings of the present subject matter may be applied are explained with reference to FIGS. 2(a) to 5(d).

Figure 2A:
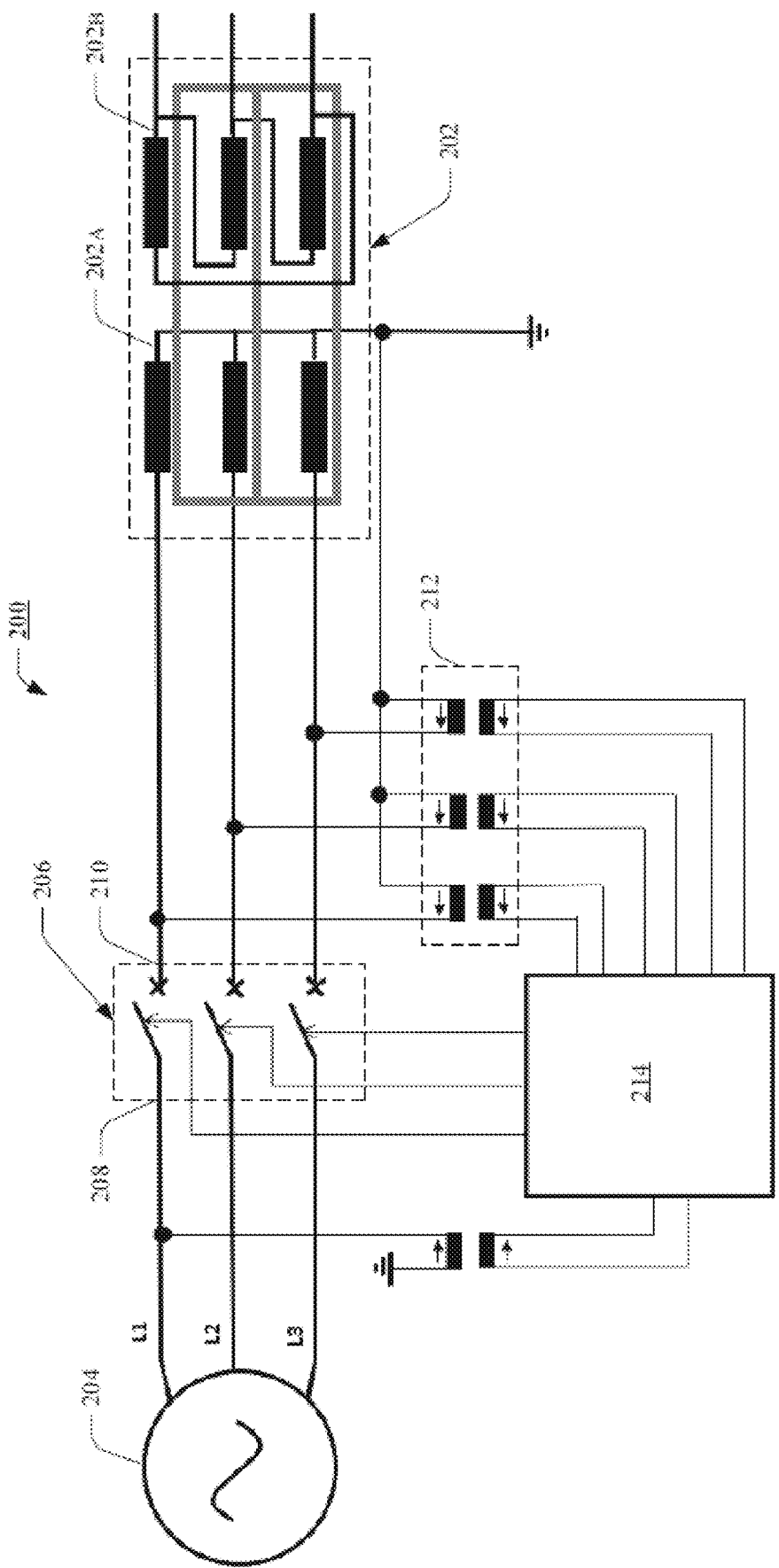
FIG. 2(a) illustrates a block diagram of a first configuration for monitoring the energization operation of a transformer, in accordance with an embodiment of the present subject matter.

FIG. 2(a) illustrates a block diagram of a first configuration 200 for monitoring the energization operation of a transformer, in accordance with an embodiment of the present subject matter. The first configuration 200 depicts a star-grounded-delta (YNd11) three-limb core transformer 202, alternatively referred to as transformer 202. The YN symbol of the YNd11 transformer 202 denotes that the transformer 202 is star-grounded on a first side 202A and the d symbol represents that the transformer 202 is connected in a delta connection on a second side 202B. The YNd11 connection indicates that a terminal voltage of a phase of the transformer measured from the second side 202B leads a terminal voltage measured from the first side 202A by 30 degrees. Also, there is no load connected on the second side 202B of the transformer 202. The three-limb core of the transformer 202 results in the magnetic coupling and the delta connection results in the electrical coupling of the transformer 202, therefore the transformer 202 is both magnetically and electrically coupled.

A three-phase alternating current (AC) source 204 supplies power to the transformer 202. In one example, the source 204 may supply power to the three phases of the transformer 202. A circuit breaker 206 is connected between the source 204 and the transformer 202. Each pole of the circuit breaker 206 is associated with a phase of the transformer 202. A first portion 208 represents a source side of the circuit breaker 206 and a second portion 210 represents a load side 210 of the circuit breaker 206. The transformer 202 is connected on the load side 210 of the circuit breaker 206.

In the first configuration 200, the transformer 202 is energized from the first side 202A which is the star-ground side of the transformer 202. A voltage measuring device 212 may measure the terminal voltage of each phase of the transformer 202. In this configuration 200, the voltage measuring device 212 is connected on the same side of energization of the transformer 202, i.e., the star-ground side of the transformer 202. However, in other example configurations, the voltage measuring device may be positioned on any side of the transformer 202.

A device 214 of the first configuration 200, may obtain a reference signal measured from the source side of the circuit breaker 206. In one example, the reference signal measured may be of any one or more of the three phases. The reference signal may either be a line-to-ground voltage measurement or a line-to line voltage measurement. The reference signal may be obtained by the device 214 to generate a closing or an opening command to close or open the circuit breaker 206 respectively. Further, the device 214 may obtain measured terminal voltages of the transformer 202, measured from the load side 210 of the circuit breaker 206. The measured terminal voltages obtained by the device 214 may be used to determine an electrical making instant of a pole of the circuit breaker 206 associated with a phase of the one or more phases of the transformer 202, alternatively referred to as an actual instant of operation of the circuit breaker 206. The electrical making instant of the circuit breaker 206 may be determined for monitoring an energization operation of the transformer 202.

On receiving the measured terminal voltages of each phase from the voltage measuring device 212, the device 214 may obtain circuit configuration parameters. In one example, the circuit configuration parameters may be provided by a user. In another example, the circuit configuration parameters may be obtained from another device. The circuit configuration parameters may include one or more of a connection configuration of a voltage measuring device, a position of the voltage measuring device, a type of the voltage measuring device, design characteristics of the electrical equipment, number of windings and their connection configuration, a type of winding configuration on which the controlled switching is performed, and a switching sequence of the electrical equipment, and the like. On obtaining the measured terminal voltages and the circuit configuration parameters, the device 214 may determine the processed voltage.

The device 214 may determine the processed voltage for the one or more phases of the transformer 202 based on one or more of the measured terminal voltages of the transformer 202 and a mapping table. The mapping table may comprise a mapping between the circuit configuration parameters and a computation to be performed on one or more of the measured terminal voltages. In the first configuration 200, the measured terminal voltages are obtained from the star-ground side of the transformer 202, which is the same side from which the transformer 202 is energized. In the first configuration 200, the measured terminal voltage measured for each phase of the transformer is a line-to-ground voltage that corresponds to a winding voltage of the transformer 202. The switching sequence considered for energizing the transformer 202 is L1-L3-L2, to reduce the effect of zero sequence current. For the switching sequence L1-L3-L2, the pole associated to a first phase of the transformer 202, alternatively referred to as a first switching phase L1 is closed first. The pole associated to a third phase, alternatively referred to as a second switching phase L3 is closed after the first pole, followed by the pole associated to a second phase, alternatively referred to as a third switching phase L2. The first switching phase L1 is energized at a line to ground voltage peak of the source voltage signal, considering the negligible residual flux. The second switching phase L3 is energized at a quarter cycle after the first switching phase L1 is energized, and the third switching phase L2 is energized after a pre-defined time from energizing the second switching phase L3. In one example, the device 214 corresponds to the device 108.

Figure 2B:
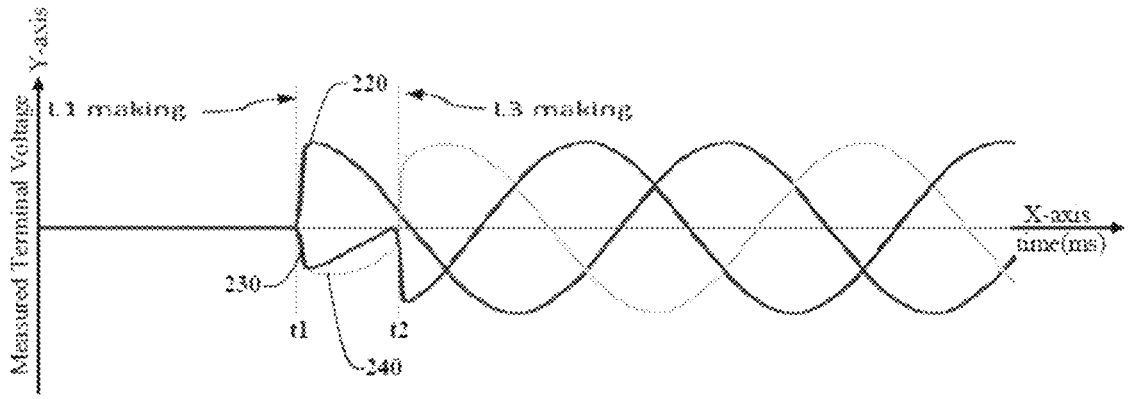
FIG. 2(b) illustrates a line-to-ground measured terminal voltage obtained for the first configuration, in accordance with an embodiment of the present subject matter.

FIG. 2(b) illustrates a line-to-ground measured terminal voltage obtained for the first configuration, in accordance with an embodiment of the present subject matter. Signal 220 depicts the line to ground measured terminal voltage for a first switching phase L1. Signal 230 depicts the line to ground measured terminal voltage for the second switching phase L3 and signal 240 depicts the line to ground measured terminal voltage for the third switching phase L2. From the FIG. 2(b) it may be observed that, on energizing the first switching phase L1 at a time instant t1, i.e., on closing the first pole of the circuit breaker 206 associated with the first phase of the transformer 202 at t1, a load voltage signal appears in the other two phases as well. The load voltage signal appears in all the three phases of the transformer 202 due to the electrical and magnetic coupling of the transformer. Due to this effect, determining the electrical making instants for the second switching phase L3 and the third switching phase L2 may be a challenge.

To determine the electrical making instants of the second switching phase L3 and the third switching phase L2 individually, the measured terminal voltages obtained from the transformer 202 are further processed. In one example, it may be irrelevant to determine the electrical making instant for the third switching phase L2, as, on energizing the first switching phase L1 at time t1 and the second switching phase L3 at a time instant t2, the resultant flux for the third pole L2 will be locked. Thus, the operating time of the third switching phase L2 may not affect the switching performance of the switching device and it is not of a primary concern to monitor the electrical making instant for last switching phase for this configuration. Hence, for this configuration, the electrical making of the second pole or the third switching phase L2 may not be determined. To determine the electrical making instant of a pole of the circuit breaker associated to a phase of the transformer 202, the processed voltage may be determined.

In one example, the processed voltage for the first switching phase L1 and the second switching phase L3 may be derived based on the measured terminal voltages and the mapping table. As discussed above, the mapping table comprises a mapping between the circuit configuration parameters and the computation to be performed on the measured terminal voltages. Based on the mapping table, for the first configuration 200, the processed voltages may be determined from equation (5), as shown below:

$$\begin{bmatrix} Vp1 \\ Vp3 \end{bmatrix} = \left(\frac{1}{\sqrt{3}}\right)\begin{bmatrix} 1 & -1 & 0 \\ 0 & 1 & -1 \end{bmatrix}\begin{bmatrix} Vm1 \\ Vm2 \\ Vm3 \end{bmatrix} \quad (5)$$

Where, Vp1 and Vp3 are the processed voltages determined for the first switching phase L1 and the second switching phase L3 respectively.

Vm1, Vm2, and Vm3 are the measured terminal voltages of the first switching phase, the third switching phase and the second switching phase respectively measured from the star-ground side of the transformer 202. In one example, the processed voltage may be determined for the second switching phase L3 alone. However, to maintain homogeneity, the computation of voltages may be applied for both the first switching phase L1 and the second switching phase L3.

Figure 2C:
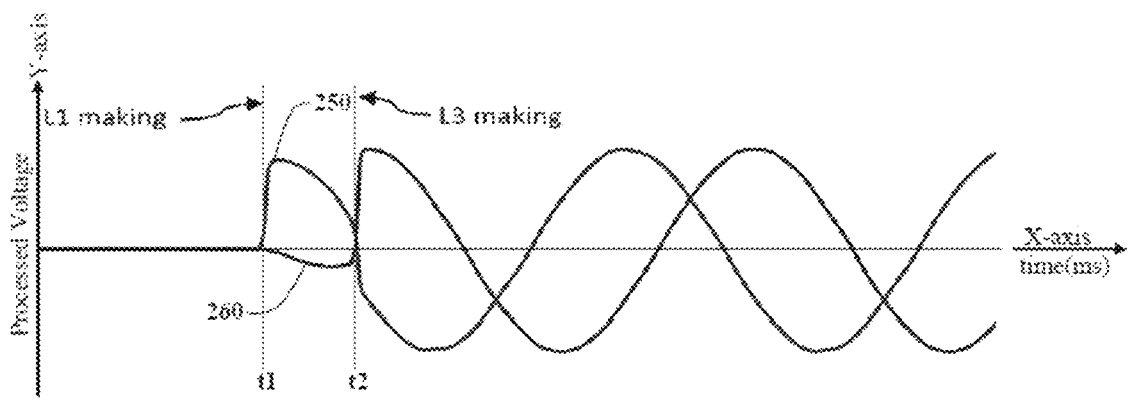
FIG. 2(c) illustrates a processed voltage determined for the first configuration, in accordance with an embodiment of the present subject matter.
Figure 2D:
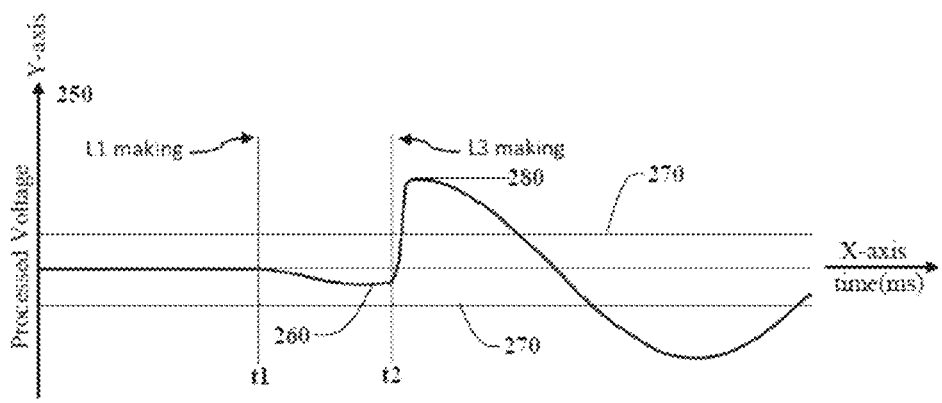
FIG. 2(d) illustrates compensation of the processed voltage signal based on a pre-determined phase-wise threshold value for the first configuration, in accordance with an embodiment of the present subject matter.

FIG. 2(c) illustrates a processed voltage determined for the first configuration 200, in accordance with an embodiment of the present subject matter. Signal 250 depicts a processed voltage for the first switching phase L1, energized at a time instant t1. Signal 260 depicts a processed voltage for the second switching phase L3, energized at a time instant t2. From FIG. 2(c), it may be observed that a small magnitude of processed voltage appears in the second switching phase L3 at the time instant t1, on energizing the first switching phase L1 at the time instant t1. The energization of the first switching phase L1 is marked as L1 making and energization of the second switching phase L3 is marked as L3 making. The small magnitude of processed voltage appearing in second switching phase L3 on energizing the first switching phase L1 at the time instant t1, may be due to the electric/magnetic coupling, interference, or noise due to external system disturbances. This voltage signal may be offset by providing a pre-determined threshold value as shown in FIG. 2(d) for the first configuration 200. The pre-determined threshold value may be alternatively referred to as a pre-determined phase-wise threshold value as each phase may have a specific pre-determined threshold value. The pre-determined phase-wise threshold value 270 (for the second switching phase L3) as shown in FIG. 2(d) may correspond to one or more of a noise, an interference, or a sub-property of the transformer 202. The sub-property of the transformer 202 may correspond to unequal magnetic flux path length in the three-limb design transformer 202 and the like. The compensation, by providing a suitable pre-determined phase-wise threshold value 270 avoids incorrect detection of the electrical making instants. The electrical making instant of the pole of the circuit breaker is determined at an instant that corresponds to a start of a rising slope of the processed voltage, where the rising slope crosses a pre-determined phase-wise threshold value 270 to reach a first voltage peak 280. Thus, the device 214 is may determine the electrical making instant of the pole of the circuit breaker 206 associated with a phase of the one or more phases of the transformer 202 based on the processed voltage for monitoring the energization operation of the transformer.

Figure 3A:
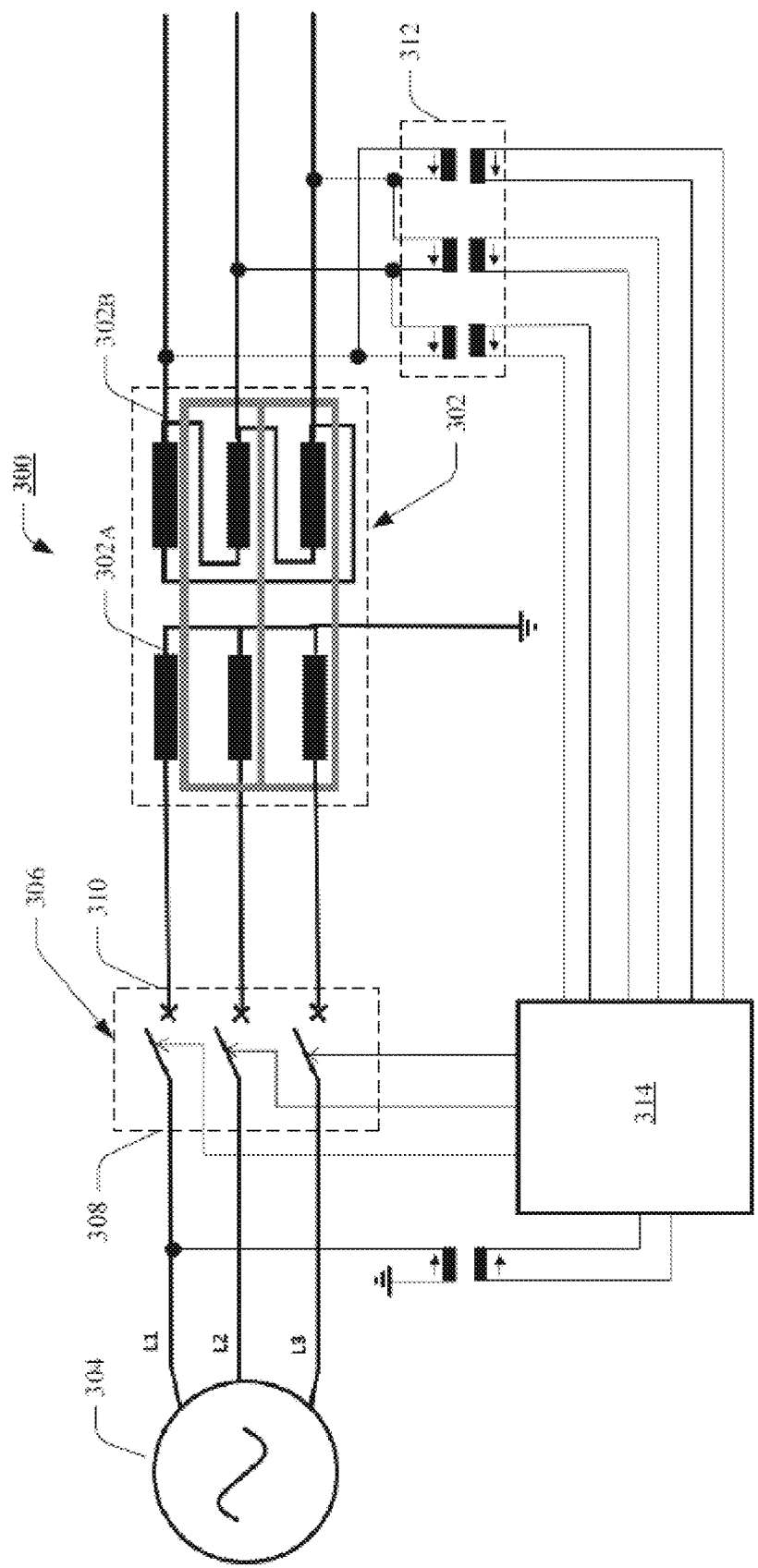
FIG. 3(a) illustrates a block diagram of a second configuration for monitoring the energization operation of a transformer, in accordance with an embodiment of the present subject matter.

FIG. 3(a) illustrates a block diagram of a second configuration 300 for monitoring the energization operation of a transformer, in accordance with an embodiment of the present subject matter. The second configuration 300 depicts a star-grounded-delta (YNd11) three-limb core transformer 302, alternatively referred to as transformer 302. The YN symbol of the YNd11 transformer 302 denotes that the transformer 302 is star-grounded on a first side 302A and the d-symbol represents that the transformer 302 is connected in a delta connection on a second side 302B. The YNd11 connection indicates that a terminal voltage measured from the second side 302B of the transformer leads the terminal voltage measured from the first side of the transformer 302A by 30 degrees. The three-limb core of the transformer 302 results in the magnetic coupling and the delta connection results in the electrical coupling of the transformer 302, therefore the transformer 302 is both magnetically and electrically coupled.

A three-phase alternating current (AC) source 304 supplies power to the transformer 302. In one example, the source 304 may supply power to the three phases of the transformer 302. A circuit breaker 306 is connected between the source 304 and the transformer 302. Each pole of the circuit breaker 306 is associated with a phase of the transformer 302. A first portion 308 represents a source side of the circuit breaker 306 and a second portion 310 represents a load side of the circuit breaker 306. The transformer 302 is connected on the load side 310 of the circuit breaker 306.

In the second configuration 300, the transformer 302 is energized from the first side 302A which is the star-ground side of the transformer 302. A voltage measuring device 312 may measure the terminal voltage of each phase of the transformer 302. For the configuration 300, the voltage measuring device 312 is connected on the second side 302B of the transformer, i.e., the delta connected side of the transformer 302.

A device 314 of the second configuration 300, may obtain a reference signal measured from the source side of the circuit breaker 306. In one example, the reference signal measured may be of any one or more of the three phases. The reference signal may either be a line-to-ground voltage measurement or a line-to line voltage measurement. The reference signal may be obtained by the device 314 to generate a closing or an opening command to close or open the circuit breaker 306 respectively. Further, the device 314 may obtain measured terminal voltages of the transformer 302, measured from the load side 310 of the circuit breaker 306. In this example, the measured terminal voltages are obtained from the delta winding of the transformer 302. The measured terminal voltages obtained by the device 314 may be used to determine an electrical making instant of a pole of the circuit breaker 306 associated with a phase of the one or more phases of the transformer 302, alternatively referred to as an actual instant of operation of the circuit breaker 306. The electrical making instant of the circuit breaker 306 may be determined for monitoring an energization operation of the transformer 302.

On receiving the measured terminal voltages from the voltage measuring device 312, the device 314 may obtain circuit configuration parameters. In one example, the circuit configuration parameters may be provided by a user. In another example, the circuit configuration parameters may be obtained from another device. The circuit configuration parameters may include one or more of a connection configuration of a voltage measuring device, a position of the voltage measuring device, a type of the voltage measuring device, design characteristics of the electrical equipment, number of windings and their connection configuration, a type of winding configuration on which the controlled switching is performed, and a switching sequence of the electrical equipment, and the like. On obtaining the measured terminal voltages and the circuit configuration parameters, the device 314 may determine the processed voltage.

The device 314 may determine the processed voltage for the one or more phases of the transformer 302 based on one or more of the measured terminal voltages of the transformer 302 and a mapping table. The mapping table may comprise a mapping between the circuit configuration parameters and a computation to be performed on one or more of the measured terminal voltages. In the second configuration 300, the measured terminal voltages are obtained from the delta winding side of the transformer 302. The measured terminal voltage measured for each phase of the transformer is a line-to-line voltage that may not correspond to a winding voltage of the transformer 302, and a winding voltage may be derived from the measured terminal voltages. The switching sequence considered for energizing the transformer 302 is L1-L3-L2, to reduce the effect of zero sequence current. For the switching sequence L1-L3-L2, the pole associated to a first phase of the transformer 302, alternatively referred to as a first switching phase L1 is closed first. The pole associated to a third phase, alternatively referred to as a second switching phase L3 is closed after the first pole, followed by the pole associated to a second phase, alternatively referred to as a third switching phase L2. The first switching phase L1 is energized at a line to ground voltage peak, source voltage signal, considering the negligible residual flux. The second switching phase L3 is energized at a quarter cycle after the first switching phase L1 is energized and the third switching phase L2 is energized after a pre-defined time from energizing the second switching phase L3 considering the negligible residual flux. In one example, the device 314 corresponds to the device 108.

Figure 3B:
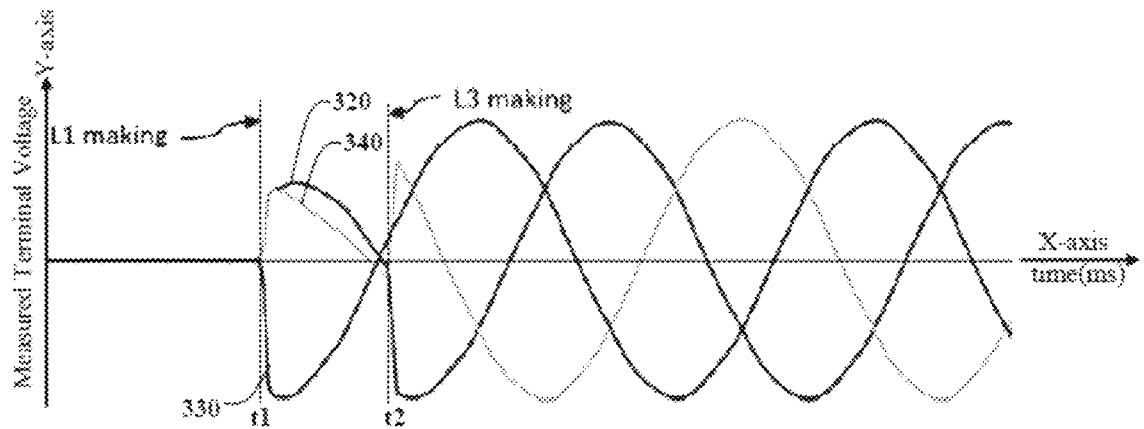
FIG. 3(b) illustrates a line-to-line measured terminal voltage obtained for the second configuration, in accordance with an embodiment of the present subject matter.

FIG. 3(b) illustrates a line-to-line measured terminal voltage obtained for the second configuration 300, in accordance with an embodiment of the present subject matter. Signal 320 depicts the line to line measured terminal voltage for the first switching phase L1. Signal 330 depicts the line to line measured terminal voltage for the second switching phase L3 and signal 340 depicts the line to line measured terminal voltage for the third switching phase L2. From the FIG. 3(b) it may be observed that, on energizing the first switching phase L1 at a time instant t1, i.e., on closing the first pole of the circuit breaker 306 associated with the first phase of the transformer 302 at t1, a load voltage signal appears in the other two phases as well. The load voltage signal appears in all the three phases of the transformer 302 due to the electrical and magnetic coupling of the transformer. Due to this effect, determining the electrical making instants from the measured terminal voltages directly for the second switching phase L3 and the third switching phase L2 may be a challenge. To determine the electrical making instant of a pole of the circuit breaker associated to a phase of the transformer 302, the processed voltage may be determined.

In one example, the processed voltage for the first switching phase L1 and the second switching phase L3 may be derived based on the measured terminal voltages and the mapping table. As discussed above, the mapping comprises a mapping between the circuit configuration parameters and the computation to be performed on the measured terminal voltages. For the second configuration 300, the processed voltages may be determined from a winding voltage. The winding voltages may be derived based on equation (6), derived from the mapping table as shown below:

$$\begin{bmatrix} Vw1 \\ Vw2 \\ Vw3 \end{bmatrix} = \begin{bmatrix} 0 & 0 & -1 \\ -1 & 0 & 0 \\ 0 & -1 & 0 \end{bmatrix} \begin{bmatrix} Vm1 \\ Vm2 \\ Vm3 \end{bmatrix} \quad (6)$$

Where, Vw1, Vw3, and Vw2 are the winding voltages derived for the first switching phase L1, the second switching phase L3, and the third switching phase L2 respectively.

Vm1, Vm3, and Vm2 are the measured terminal voltages of the first switching phase L1, the second switching L3, and the third switching phase L2 respectively measured from the delta winding side of the transformer 302.

In one example, the processed voltages Vp1 and Vp3 for detecting the electrical making instants of the first switching phase L1 and the second switching phase L3 respectively may be determined from the winding voltages Vw1, Vw2, and Vw3, as shown below in equation (7):

$$\begin{bmatrix} Vp1 \\ Vp3 \end{bmatrix} = \left(\frac{1}{\sqrt{3}}\right)\begin{bmatrix} 1 & -1 & 0 \\ 0 & 1 & -1 \end{bmatrix}\begin{bmatrix} Vw1 \\ Vw2 \\ Vw3 \end{bmatrix} \quad (7)$$

Where, Vp1 and Vp3 are the processed voltages determined for the first switching phase L1 and the second switching phase L3 respectively.

In another example, the processed voltages Vp1 and Vp3 may be directly be determined from the measured voltages Vm1, Vm2, and Vm3 as shown below in equation (8):

$$\begin{bmatrix} Vp1 \\ Vp3 \end{bmatrix} = \left(\frac{1}{\sqrt{3}}\right)\begin{bmatrix} 1 & -1 & 0 \\ 0 & 1 & -1 \end{bmatrix}\begin{bmatrix} 0 & -1 & 0 \\ -1 & 0 & 0 \\ 0 & 0 & -1 \end{bmatrix}\begin{bmatrix} Vm1 \\ Vm2 \\ Vm3 \end{bmatrix} \quad (8)$$

Where, Vp1 and Vp3 are the processed voltages determined for the first switching phase L1 and the second switching phase L3 respectively; and Vm1, Vm3, and Vm2 are the measured terminal voltages of the first switching phase L1, the second switching L3, and the third switching phase L2 respectively measured from the delta winding side of the transformer 302.

In one example, a first method to determine the processed voltages directly from the measured terminal voltages may be performed, or a second method to determine the processed voltages from the winding voltages may be performed. In one example, a user may select either the first method of determining processed voltages or the second method of determining processed voltages and may provide this input to the device 314.

Figure 3C:
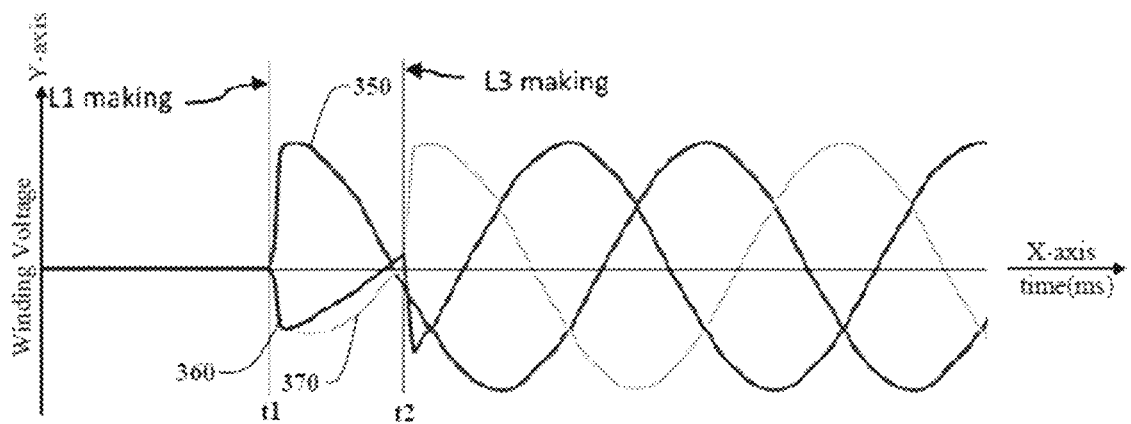
FIG. 3(c) illustrates a derived winding voltage determined for the second configuration, in accordance with an embodiment of the present subject matter.
Figure 3D:
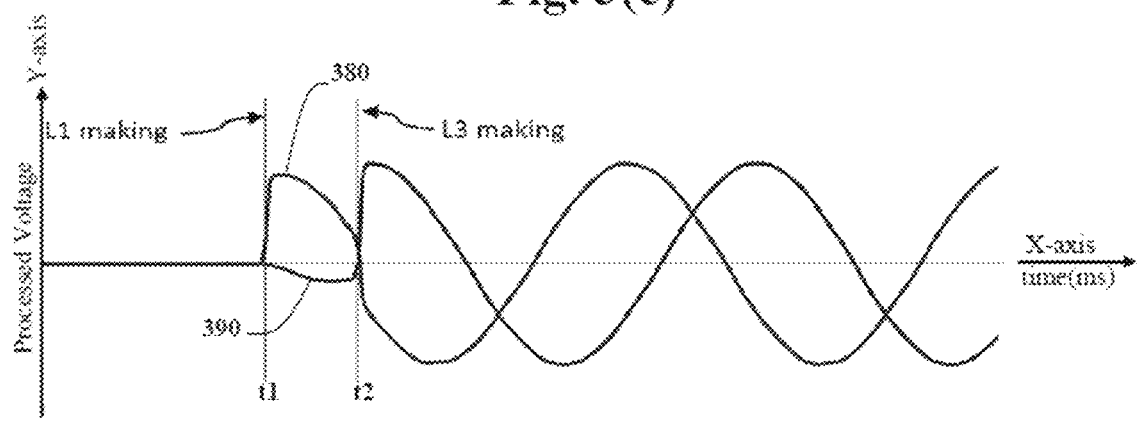
FIG. 3(d) illustrates a processed voltage determined for the second configuration, in accordance with an embodiment of the present subject matter.

FIG. 3(c) illustrates a derived winding voltage determined for the second configuration 300, in accordance with an embodiment of the present subject matter. Signal 350 depicts a derived winding voltage for the first switching phase L1, energized at a time instant t1. Signal 360 depicts a derived winding voltage for the second switching phase L3, energized at a time instant t2. Signal 370 depicts a derived winding voltage for the third switching phase L2. The processed voltages for the first switching phase L1 and the second switching phase L3 are derived from the derived winding voltages as shown in FIG. 3(c). The processed voltages determined for the second configuration 300 are depicted in FIG. 3(d). Signal 380 depicts a processed voltage for the first switching phase L1, energized at a time instant t1. Signal 390 depicts a processed voltage for the second switching phase L3, energized at a time instant t2. It may be observed that a small magnitude of processed voltage appears in the second switching phase L3 between the time instant t1 and the time instant t2, on energizing the first switching phase L1. The energization of the first switching phase L1 is marked as L1 making and energization of the second switching phase L3 is marked as L3 making, respectively. The small magnitude of processed voltage appearing in second switching phase L3 on energizing the first switching phase L1, may be due to the electric/magnetic coupling, an interference, or a noise due to external system disturbances. This voltage signal may be offset by providing a pre-determined phase-wise threshold value (not shown in the figure). Thus, the device 314 may determine the electrical making instant of the pole of the circuit breaker 306 associated with a phase of the one or more phases of the transformer 302 based on the processed voltage for monitoring the energization operation of the transformer. The electrical making instant of the pole of the circuit breaker device is determined as an instant corresponding to a start of a rising slope of the processed voltage, where the rising slope crosses a pre-determined phase-wise threshold value. In one example, the pre-determined phase-wise threshold value may correspond to one or more of a noise, an interference, or a sub-property of the transformer 302. The sub-property of the transformer 302 may correspond to unequal magnetic flux path length in the three-limb design transformer 302 and the like. This compensation, by providing a suitable pre-determined phase-wise threshold value avoids incorrect detection of the electrical making instants.

Figure 4A:
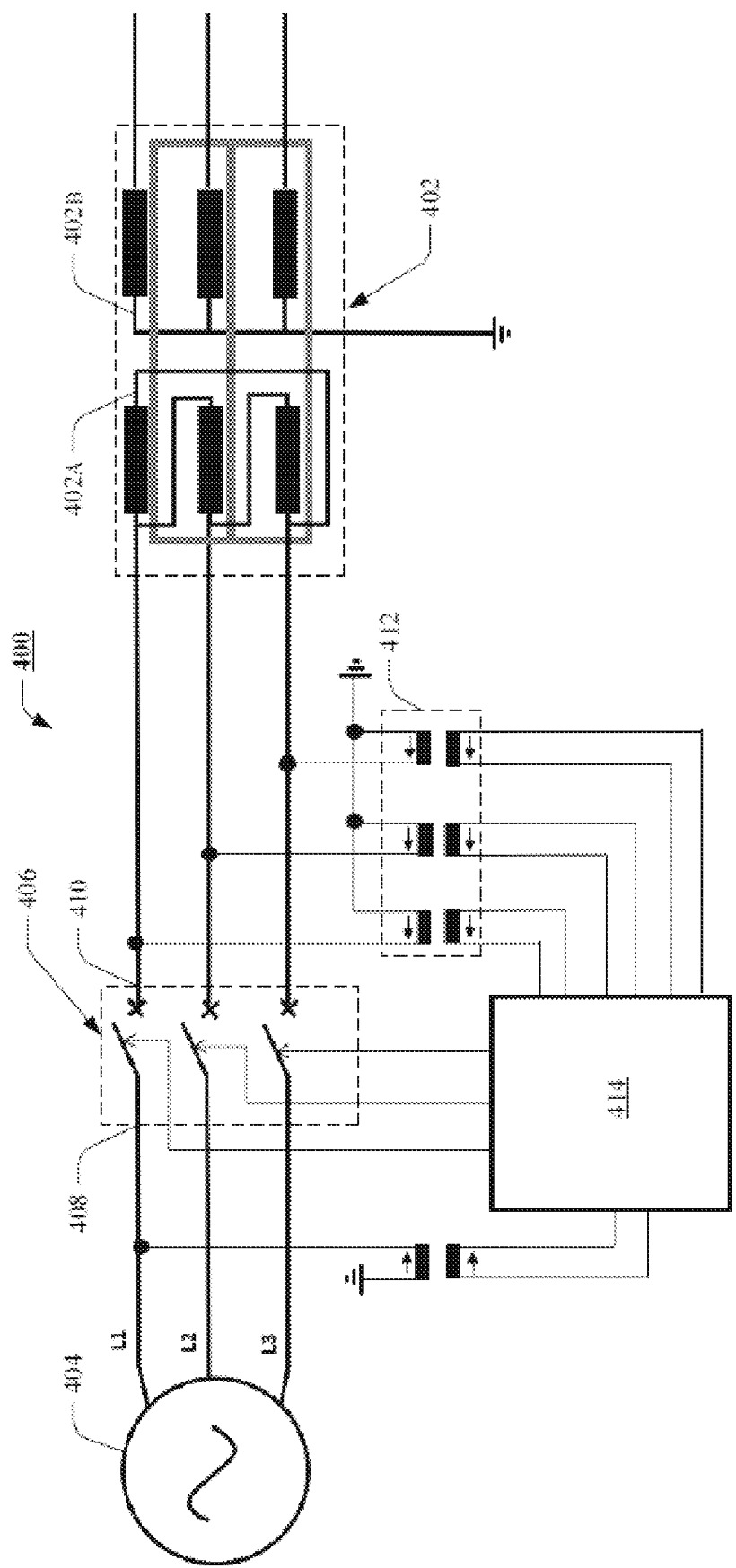
FIG. 4(a) illustrates a block diagram of a third configuration for monitoring the energization operation of a transformer, in accordance with an embodiment of the present subject matter.

FIG. 4(a) illustrates a block diagram of a third configuration 400 for monitoring the energization operation of a transformer, in accordance with an embodiment of the present subject matter. The third configuration 400 depicts a star-grounded-delta (YNd11) three limb core transformer 402, alternatively referred to as transformer 402. The d symbol denotes that the transformer 402 is connected in a delta connection on a first side 402A. The YN symbol of the YNd11 transformer 402 denotes that the transformer 402 is star-grounded on a second side 402B. The Yd11 connection indicates that terminal voltage of a phase of the transformer 402 measured from the first side 402A leads a terminal voltage measured form the second side 402B of that phase by 30 degrees. The three-limb core of the transformer 402 results in the magnetic coupling and the delta connection results in the electrical coupling of the transformer 402, therefore the transformer 402 is both magnetically and electrically coupled.

A three-phase alternating current (AC) source 404 supplies power to the transformer 402. In one example, the source 404 may supply power to the three phases of the transformer 402. A circuit breaker 406 is connected between the source 404 and the transformer 402. Each pole of the circuit breaker 406 is associated with a phase of the transformer 402. A first portion 408 represents a source side of the circuit breaker 406 and a second portion 410 represents a load side 410 of the circuit breaker 406. The transformer 402 is connected on the load side 410 of the circuit breaker 406.

In the third configuration 400, the transformer 402 is energized from the first side 402A which is the delta (d) side of the transformer 402. A voltage measuring device 412 may measure the terminal voltage of each phase of the transformer 402. In the third configuration 400, the voltage measuring device 412 is connected on the same side of energization of the transformer 402, i.e., the delta (d) side of the transformer 402.

A device 414 of the third configuration 400, may obtain a reference signal measured from the source side of the circuit breaker 406. In one example, the reference signal measured may be of any one or more of the three phases. The reference signal may either be a line-to-ground voltage measurement or a line-to line voltage measurement. The reference signal may be obtained by the device 414 to generate a closing or an opening command to close or open the circuit breaker 406 respectively. Further, the device 414 may obtain measured terminal voltages of the transformer 402, measured from the load side 410 of the circuit breaker 406. In this example, the measured terminal voltages are obtained from the delta winding of the transformer 402. The measured terminal voltages obtained by the device 414 may be used to determine an electrical making instant of a pole of the circuit breaker 406 associated with a phase of the one or more phases of the transformer 402, alternatively referred to as an actual instant of operation of the circuit breaker 406. The electrical making instant of the circuit breaker 406 may be determined for monitoring an energization operation of the transformer 402.

On receiving the measured terminal voltages of each phase from the voltage measuring device 412, the device 414 may obtain circuit configuration parameters. In one example, the circuit configuration parameters may be provided by a user. In another example, the circuit configuration parameters may be obtained from another device. The circuit configuration parameters may include one or more of a connection configuration of a voltage measuring device, a position of the voltage measuring device, a type of the voltage measuring device, design characteristics of the electrical equipment, number of windings and their connection configuration, a type of winding configuration on which the controlled switching is performed, and a switching sequence of the electrical equipment, and the like. On obtaining the measured terminal voltages and the circuit configuration parameters, the device 414 may determine the processed voltage.

The device 414 may determine the processed voltage for the one or more phases of the transformer 402 based on one or more of the measured terminal voltages of the transformer 402 and a mapping table. The mapping table may comprise a mapping between the circuit configuration parameters and the computation to be performed on the measured terminal voltages. In the third configuration 400, the measured terminal voltages are obtained from the delta winding side of the transformer 402. In this example configuration 400, the measured terminal voltage measured for each phase of the transformer is a line-to-ground voltage of the transformer 402. The switching sequence considered for energizing the transformer 402 is a non-simultaneous energization strategy L1-L2-L3. For the switching sequence L1-L2-L3, the pole associated to a first phase of the transformer 402, alternatively referred to as a first switching phase L1 is closed simultaneously with the pole associated to a second phase, alternatively referred to as a second switching phase L2, followed by the pole associated to a third phase, alternatively referred to as a third switching phase L3. The first switching phase L1 and the second switching phase L2 are energized at a line-to-line voltage peak of the measured terminal voltage signal, considering the negligible residual flux. The third switching phase (L3) is energized at a quarter cycle (90 degrees) after simultaneously energizing the first and second switching phases L1 and L2. However, the first switching phase L1 is energized prior to the second switching phase L2 with a pre-defined time duration to maintain the mentioned switching sequence of L1-L2-L3. In one example, the device 414 corresponds to the device 108.

Figure 4B:
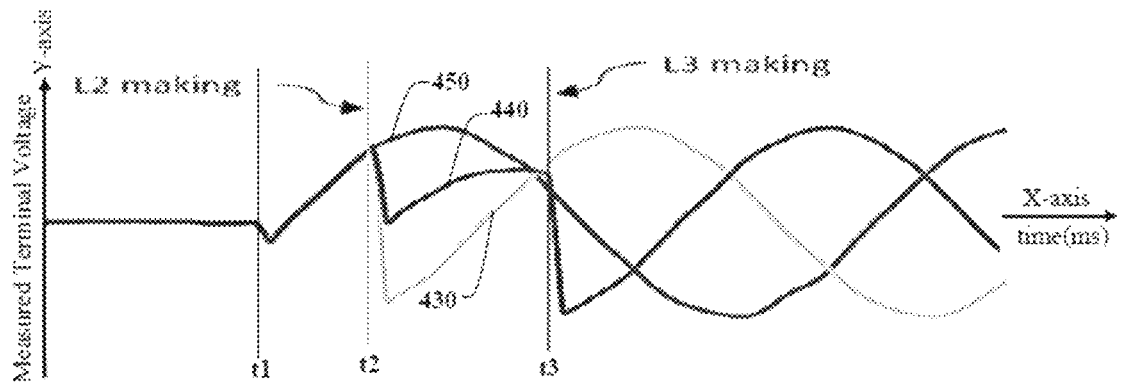
FIG. 4(b) illustrates a line-to-ground measured terminal voltage obtained for the third configuration, in accordance with an embodiment of the present subject matter.
Figure 4C:
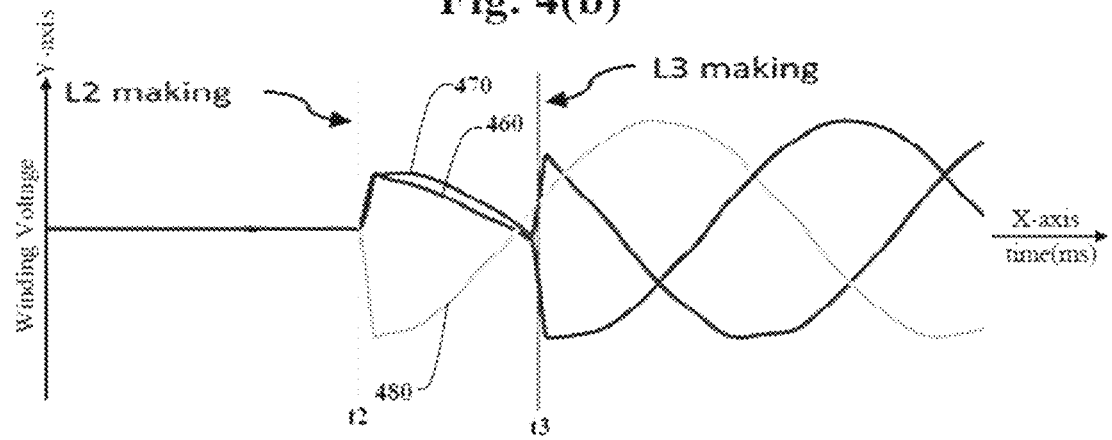
FIG. 4(c) illustrates a derived winding voltage for the third configuration, in accordance with an embodiment of the present subject matter.

FIG. 4(b) illustrates a line-to-ground measured terminal voltage obtained for the third configuration 400, in accordance with an embodiment of the present subject matter. Signal 420 depicts the line to ground measured terminal voltage for a first switching phase L1. Signal 430 depicts the line to ground measured terminal voltage for the second switching phase L2 and signal 440 depicts the line to ground measured terminal voltage for the third switching phase L3. As shown in FIG. 4(b), the direct voltage measurement cannot be used for detection of the electrical making instants of the second switching phase L2 and the third switching phase L3. From the figure it may be observed that, on energizing the first switching phase L1 at a time instant t1, i.e., on closing the first pole of the circuit breaker 406 associated with the first phase of the transformer 402, a load voltage signal appears in the other two phases as well. As it may be understood, upon energizing the first switching phase L1, due to the delta connection, the voltage will appear in the all the three phases. However, no current will flow till the second switching phase L2 is energized. This is due to the absence of return path to facilitate the current flow. Therefore, detecting the electrical making instant for the first switching phase L1 is not a primary concern. Due to this effect, determining the electrical making instants for the second switching phase L2 and the third switching phase L3 may be a challenge. To determine the electrical making instants of the second switching phase L2 and the third switching phase L3 individually, the processed voltage may be determined.

In one example, the processed voltage for the second switching phase L2 and the third switching phase L3 may be derived based on one or more of the measured terminal voltages and the mapping table. As discussed above, the mapping comprises a mapping between the circuit configuration parameters and the computation to be performed on one or more of the measured terminal voltages. For the third configuration 400, the processed voltages may be determined from a winding voltage. The winding voltages for the third configuration 400 may be derived based on the equation (10), based on the mapping table as shown below:

$$\begin{bmatrix} Vw1 \\ Vw2 \\ Vw3 \end{bmatrix} = \left(\frac{1}{\sqrt{3}}\right) \begin{bmatrix} 1 & 0 & -1 \\ -1 & 1 & 0 \\ 0 & -1 & 1 \end{bmatrix} \begin{bmatrix} Vm1 \\ Vm2 \\ Vm3 \end{bmatrix} \quad (10)$$

Where, Vw1, Vw2, and Vw3 are the winding voltages determined for the first switching phase L1, the second switching phase L2, and the third switching phase L3 respectively.

Vm1, Vm2, and Vm3 are the measured terminal voltages of the first switching phase L1, the second switching L2, and the third switching phase L3 respectively measured from the delta winding side of the transformer 402. The derived winding voltages Vw1, Vw2, and Vw3 for the third configuration 400 are represented by Signal 460, Signal 480, and Signal 470 respectively in FIG. 4(c).

In one example, the processed voltages Vp2 and Vp3 for detecting the electrical making instants for the second switching phase L2 and the third switching phase L3 respectively may be determined based on the winding voltages Vw1, Vw2, and Vw3, as shown below in equation (11):

$$\begin{bmatrix} Vp2 \\ Vp3 \end{bmatrix} = \left(\frac{1}{\sqrt{3}}\right) \begin{bmatrix} 0 & 1 & -1 \\ -1 & 0 & 1 \end{bmatrix} \begin{bmatrix} Vw1 \\ Vw2 \\ Vw3 \end{bmatrix} \quad (11)$$

Where, Vp2 and Vp3 are the processed voltages determined for the second switching phase L2 and the third switching phase L3 respectively.

Figure 4D:
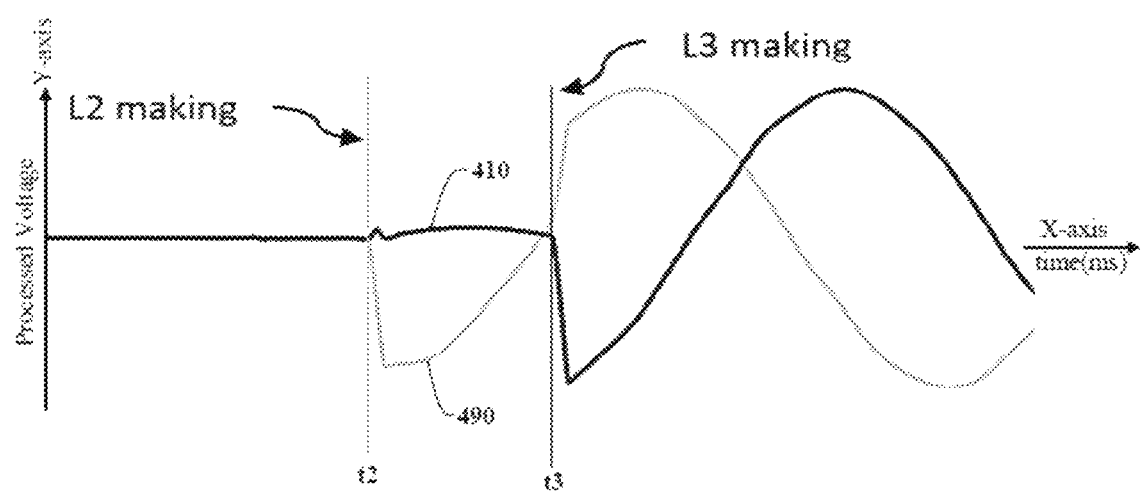
FIG. 4(d) illustrates a processed voltage determined for the third configuration, in accordance with an embodiment of the present subject matter.

FIG. 4(d) illustrates a processed voltage determined for the third configuration 400, in accordance with an embodiment of the present subject matter. Signal 490 depicts a processed voltage for the second switching phase L2, energized at a time instant t2. Signal 410 depicts a processed voltage for the third switching phase L3, energized at a time instant t3. FIG. 4(d), depicts the processed voltages for the third switching phase L3, a small magnitude of voltage appears on closing only the second switching phase L2, as discussed above. Thus, the device 414 may determine the electrical making instant of the pole of the circuit breaker 406 associated with a phase of the one or more phases of the transformer 402 based on the processed voltage for monitoring the energization operation of the transformer. The electrical making instant of the pole of the circuit breaker device is determined at an instant corresponding to a start of a rising slope of the processed voltage, where the rising slope crosses a pre-determined phase-wise threshold value (not shown in the figure). In one example, the pre-determined phase-wise threshold value may correspond to one or more of a noise, an interference, or a sub-property of the transformer 402. The sub-property of the transformer 402 may correspond to unequal magnetic flux path length in the three-limb design transformer 402 and the like. Compensating for the small magnitude of voltage on energizing only the second switching phase by providing a suitable pre-determined phase-wise threshold value avoids incorrect detection of the electrical making instants.

Figure 5A:
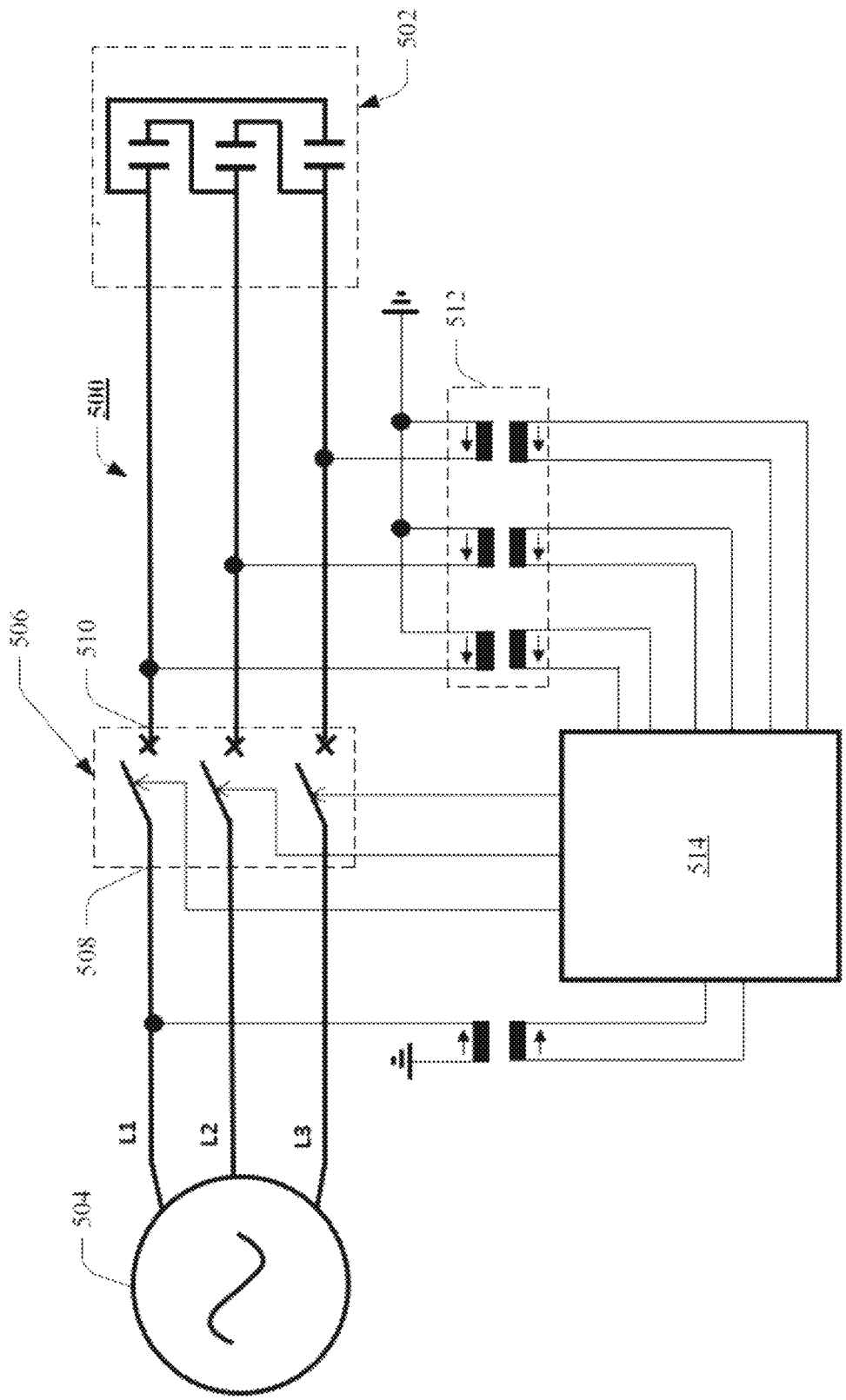
FIG. 5(a) illustrates a block diagram of a fourth configuration for monitoring the energization operation of a delta connected capacitor bank, in accordance with an embodiment of the present subject matter.

FIG. 5(a) illustrates a block diagram of a fourth configuration 500 for monitoring the energization operation of a delta connected capacitor bank, in accordance with an embodiment of the present subject matter. The fourth configuration 500 depicts a delta connected capacitor bank 502, alternatively referred to as a capacitor bank 502. The capacitor bank 502 is designed to be a three-phase delta connected capacitor bank. The delta connection of the capacitor bank 502 results in the electrical coupling of the capacitor bank.

A three-phase alternating current (AC) source 504 supplies power to the capacitor bank 502. In one example, the source 504 may supply power to the three phases of the capacitor bank 502. A circuit breaker 506 is connected between the source 504 and the capacitor bank 502. Each pole of the circuit breaker is associated with a phase of the capacitor bank 502. A first portion 508 represents a source side of the circuit breaker 506 and a second portion 510 represents a load side 510 of the circuit breaker 506. The capacitor bank 502 is connected on the load side 510 of the circuit breaker 506.

In the fourth configuration 500, a voltage measuring device 512 may measure the terminal voltage of each phase of the capacitor bank 502. In this fourth configuration 500, the voltage measuring device 512 is connected on the load side of the circuit breaker 506.

A device 514 of the fourth configuration 500, may obtain a reference signal measured from the source side of the circuit breaker 506. In one example, the reference signal measured may be of any one or more of the three-phases. The reference signal may either be a line-to-ground voltage measurement or a line-to line voltage measurement. The reference signal may be obtained by the device 514 to generate a closing or an opening command to close or open the circuit breaker 506 respectively. Further, the device 514 may obtain measured terminal voltages of the capacitor bank 502, measured from the load side 510 of the circuit breaker 506. The measured terminal voltages obtained by the device 514 may be used to determine an electrical making instant of a pole of the circuit breaker 506 associated with a phase of the one or more phases of the capacitor bank 502, alternatively referred to as an actual instant of operation of the circuit breaker 506. The electrical making instant of the circuit breaker 506 may be determined for monitoring an energization operation of the delta connected capacitor bank 502.

On receiving the measured terminal voltages from the voltage measuring device 512, the device 514 may obtain circuit configuration parameters. In one example, the circuit configuration parameters may be provided by a user. In another example, the circuit configuration parameters may be obtained from another device. The circuit configuration parameters may include one or more of a connection configuration of a voltage measuring device, a position of the voltage measuring device, a type of the voltage measuring device, design characteristics of the electrical equipment, number of windings and their connection configuration, a type of winding configuration on which the controlled switching is performed, and a switching sequence of the electrical equipment, and the like. On obtaining the measured terminal voltages and the circuit configuration parameters, the device 514 may determine the processed voltage.

The device 514 may determine the processed voltage for the one or more phases of the capacitor bank 502 based on one or more of the measured terminal voltages of the capacitor bank 502 and a mapping table. The mapping table may comprise a mapping between the circuit configuration parameters and the computation to be performed on one or more of the measured terminal voltages. In the fourth configuration 500, the measured terminal voltage measured for each phase of the capacitor bank 502 is a line-to-ground voltage of the capacitor bank 502. The switching sequence considered for energizing the capacitor bank 502 that is fully discharged is a non-simultaneous switching sequence L1-L2-L3. For the switching sequence L1-L2-L3, the pole associated to a first phase of the capacitor bank 502, alternatively referred to as a first switching phase L1 is closed simultaneously with the pole associated to a second phase, alternatively referred to as a second switching phase L2, followed by the pole associated to a third phase, alternatively referred to as a third switching phase L3. The first switching phase L1 and the second switching phase L2 are energized at a line-to-line voltage zero of the measured terminal voltage signal, considering the capacitor bank to be discharged. The third switching phase (L3) is energized at a quarter cycle (90 degrees) after simultaneously energizing the first and second switching phases L1 and L2. However, the first switching phase L1 phase is energized prior to the second switching phase L2 with a pre-defined time duration to maintain the mentioned switching sequence of L1-L2-L3. In one example, the device 514 corresponds to the device 108.

Figure 5B:
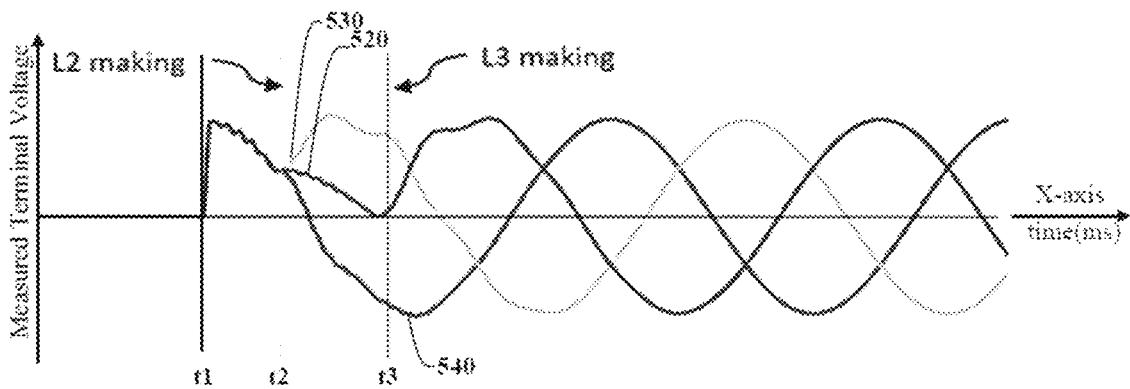
FIG. 5(b) illustrates a line-to-ground measured terminal voltage obtained for the for the fourth configuration, in accordance with an embodiment of the present subject matter.

FIG. 5(b) illustrates a line-to-ground measured terminal voltage obtained for the fourth example configuration 500, in accordance with an embodiment of the present subject matter. Signal 520 depicts the line to ground measured terminal voltage for a first switching phase L1. Signal 530 depicts the line to ground measured terminal voltage for the second switching phase L2 and signal 540 depicts the line to ground measured terminal voltage for the third switching phase L3. As shown in FIG. 5(b), the direct voltage measurement cannot be used for detection of the electrical making instants of the second switching phase L2 and the third switching phase L3. From the figure it may be observed that, on energizing the first switching phase L1 at a time instant t1, i.e., on closing the first pole of the circuit breaker 506 associated with the first phase of the capacitor bank 502 at t1, a load voltage appears in the other two phases as well. As it may be understood, upon energizing the first switching phase L1, due to the delta connection, the voltage will appear in the all the three phases. However, no current will flow till the second switching phase L2 is energized. This is due to the absence of return path to facilitate the current flow. Therefore, detecting the electrical making instant for the first switching phase L1 is not a primary concern. Due to this effect, determining the electrical making instants for the second switching phase L2 and the third switching phase L3 may be a challenge. To determine the electrical making instant of a pole of the circuit breaker associated to a phase of the capacitor bank 502, the processed voltage may be determined.

In one example, the processed voltage for the second switching phase L2 and the third switching phase L3 may be derived based on the measured terminal voltages and the mapping table. As discussed above, the mapping table comprises a mapping between the circuit configuration parameters and the computation to be performed on the measured terminal voltages table. For the fourth configuration 500, the processed voltages may be determined from a voltage across an equivalent capacitance for each phase also referred to as phase wise equivalent voltage. The voltage across an equivalent capacitance for each phase of the capacitor bank 502, may be determined based on equation (12) based on the mapping table as shown below:

$$\begin{bmatrix} Ve1 \\ Ve2 \\ Ve3 \end{bmatrix} = \left(\frac{1}{\sqrt{3}}\right) \begin{bmatrix} 1 & -1 & 0 \\ 0 & 1 & -1 \\ -1 & 0 & 1 \end{bmatrix} \begin{bmatrix} Vm1 \\ Vm2 \\ Vm3 \end{bmatrix} \quad (12)$$

Where Vm1, Vm2, and Vm3 are the measured terminal voltages of the first switching phase L1, the second switching L2, and the third switching phase L3 respectively measured from the capacitor bank 502;

Ve1, Ve2, and Ve3 are the phase wise equivalent voltage for the first switching phase L1, the second switching phase L2, and the third switching phase L3 respectively.

Further, based on the derived phase wise equivalent voltages, the processed voltages for the fourth configuration 500 may be derived based on the equation (13) based on the mapping table as shown below:

$$\begin{bmatrix} Vp2 \\ Vp3 \end{bmatrix} = \left(\frac{1}{\sqrt{3}}\right) \begin{bmatrix} -1 & 1 & 0 \\ 0 & 1 & -1 \end{bmatrix} \begin{bmatrix} Ve1 \\ Ve2 \\ Ve3 \end{bmatrix} \quad (13)$$

Where Vp2 and Vp3 are the processed voltages determined for the second switching phase L2 and the third switching phase L3 respectively.

Figure 5C:
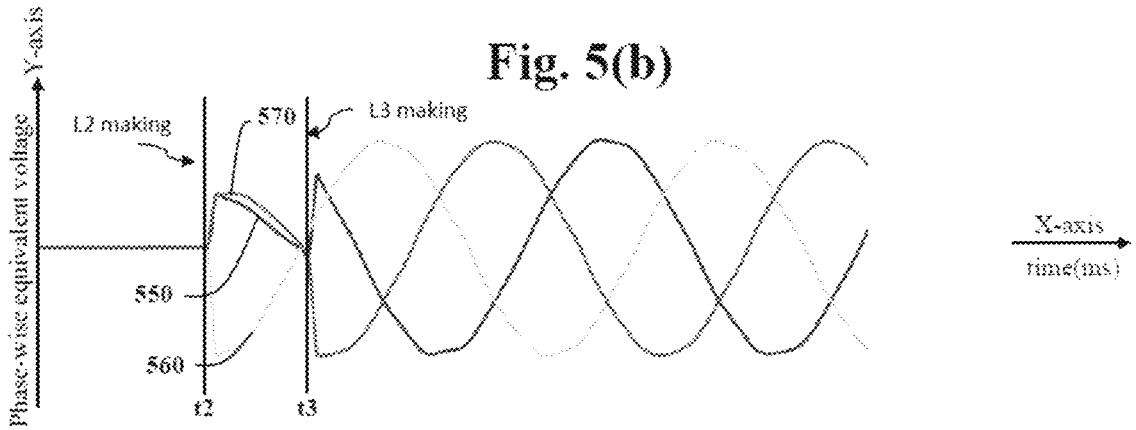
FIG. 5(c) illustrates a phase-wise equivalent voltage derived for the fourth configuration, in accordance with an embodiment of the present subject matter.

FIG. 5(c) illustrates a phase-wise equivalent voltage derived for the fourth configuration, in accordance with an embodiment of the present subject matter. Signal 550 depicts the equivalent voltage for a first switching phase L1. Signal 560 depicts the equivalent voltage for the second switching phase L2 and signal 570 depicts the equivalent voltage for the third switching phase L3. The processed voltages as shown in FIG. 5(d) are derived from the phase-wise equivalent voltages as shown in FIG. 5(c).

Figure 5D:
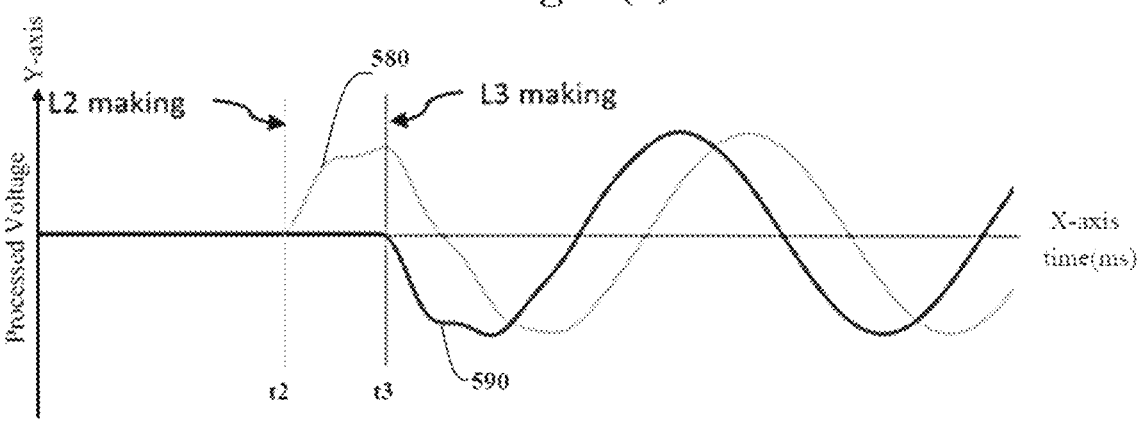
FIG. 5(d) illustrates a processed voltage determined for the fourth configuration, in accordance with an embodiment of the present subject matter.

FIG. 5(d) illustrates a processed voltage determined for the fourth configuration 500, in accordance with an embodiment of the present subject matter. Signal 580 depicts a processed voltage for the second switching phase L2, energized at a time instant t2. Signal 590 depicts a processed voltage for the third switching phase L3, energized at a time instant t3. Thus, the device 514 may determine the electrical making instant of the pole of the circuit breaker 506 associated with a phase of the one or more phases of the capacitor bank 502 based on the processed voltage for monitoring the energization operation of the capacitor bank 502. The electrical making instant of the pole of the circuit breaker device is determined at an instant corresponding to a start of a rising slope of the processed voltage, where the rising slope crosses a pre-determined phase-wise threshold value (not shown in the figure). In one example, the pre-determined phase-wise threshold value may correspond to one or more of a noise, an interference, or a sub-property of the delta connected capacitor bank 502. Compensating for the small magnitude of voltage on energizing only the second switching by providing a suitable pre-determined phase-wise threshold value avoids incorrect detection of the electrical making instants. A similar approach may be applied to a magnetically coupled reactor bank, an ungrounded non-magnetically coupled reactor, and the like.

Figure 6:
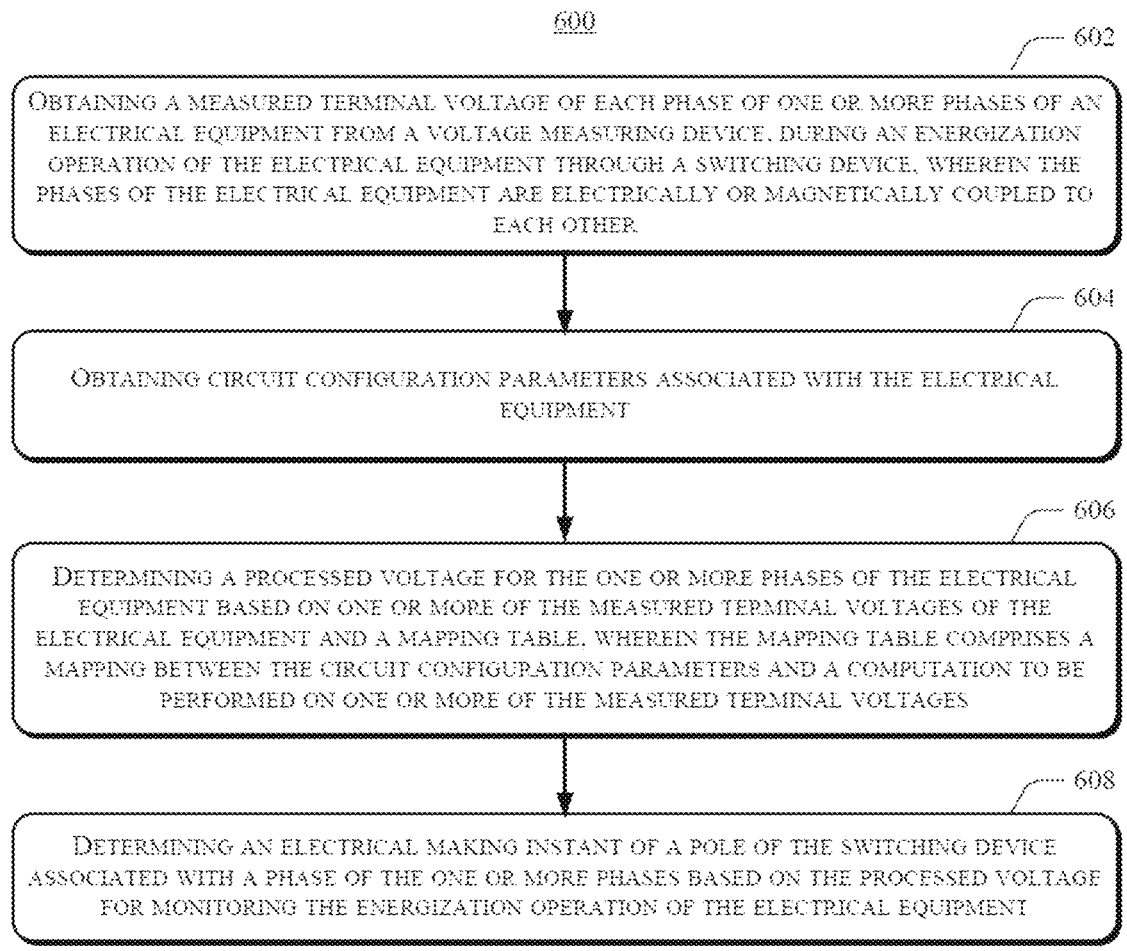
FIG. 6 illustrates a method for determining an electrical making instant of a switching device, in accordance with an embodiment of the present subject matter.

FIG. 6 illustrates a method for determining an electrical making instant of a switching device, in accordance with an embodiment of the present subject matter. The order in which method 600 is described is not intended to be construed as a limitation, and some of the described method blocks may be performed in a different order to implement the method 600 or an alternative method. Furthermore, the method 600 may be implemented in any suitable hardware, computer readable instructions, firmware, or combination thereof. For discussion, the method 600 is described with reference to the implementations illustrated in FIG. 1.

In the method 600, at block 602 a measured terminal voltage is obtained for each phase of one or more phases of an electrical equipment from a voltage measuring device, during an energization operation of the electrical equipment through a switching device, where the phases of the electrical equipment are electrically or magnetically coupled to each other. In one example, the electrical equipment is any one of a magnetically and/or electrically coupled transformer, a delta connected or ungrounded capacitor bank, a delta connected or ungrounded non-magnetically coupled reactor, or a magnetically coupled reactor. In one example, the measured terminal voltage of each phase may be obtained from the voltage measuring device connected on a load side of the switching device.

At block 604, circuit configuration parameters associated with the electrical equipment is obtained. In one example, the circuit configuration parameters may include one or more of a connection configuration of a voltage measuring device, a position of the voltage measuring device, a type of the voltage measuring device, design characteristics of the electrical equipment, number of windings and their connection configuration, a type of winding configuration on which the controlled switching is performed, a switching sequence of the electrical equipment, and the like. The connection configuration of the voltage measuring device may refer to how the windings of the voltage measuring device are connected. For example, if the voltage measuring device is a star-ground-delta connected potential transformer, then the connection configuration of the measuring device refers to the potential transformer having a winding which is star-ground connected and another winding that is delta connected. The position of the voltage measuring device refers to the side on which the voltage measuring device is connected. For example, if the electrical equipment is a star-delta transformer, then the position of the voltage measuring device may refer to the voltage measuring device bring connected on the star side of the transformer, or the delta side of the transformer. The design characteristics of the electrical equipment, such as a transformer, may include a core design of the transformer, how the delta connection on the winding is formed, and the like. The switching sequence refers to the order in which the poles of the circuit breaker associated with phases of the electrical equipment are closed. The type of electrical equipment on which the controlled switching is to be performed may be a coupled load, such as a transformer, a capacitor bank, or a reactor bank to name a few.

At block 606, a processed voltage is determined for the one or more phases of the electrical equipment. The processed voltage is determined based one or more of the measured terminal voltages of the electrical equipment and a mapping table. The mapping table comprises a mapping between the circuit configuration parameters and a computation to be performed on the one or more of the measured terminal voltages. In one example, the mapping table may be determined theoretically through circuit analysis.

At block 608, an electrical making instant of a pole of the switching device associated with a phase of the one or more phases is determined based on the processed voltage for monitoring the energization operation of the electrical equipment. The electrical making instant of the pole of the switching device is determined at the instant corresponding to a start of a rising slope of the processed voltage, where the rising slope crosses a pre-determined phase-wise threshold value to reach a first voltage peak. The pre-determined phase-wise threshold value corresponds to one or more of a noise, an interference, or a sub-property. The sub-property of the electrical equipment may refer to design properties of the electrical equipment, such as unequal magnetic flux path length in the three-limb core design transformer, or unequal magnetic flux path length in the reactor and the like.

The electrical making instant of the pole of the switching device may be determined for monitoring the energization operation of the electrical equipment. In one example, monitoring the energization operation of the electrical equipment includes evaluating a making time which is based on the determined electrical making instant of the pole of the switching device evaluated during the energization operation. The making time of the pole of the switching device is the time from when the switching device receives a closing command till the circuit is detected to be closed electrically through the determined electrical making instant. The evaluated making time may be compared to an expected making time for the circuit configuration parameters obtained, to determine an error. Based on the determined error, a correction may be applied to a closing time of the pole of the switching device to improve performance of a subsequent energization operation. In one example, the measured terminal voltage of any one phase of the one or more phases or any two phases of the one or more phases is used to determine the processed voltage to detect the electrical making instant of the pole of the circuit breaker associated with any other phase of the one or more phases, based on the mapping table. In another example, when the electrical equipment is inductive having a magnetic circuit, the step of determining the processed voltage may be performed by determining a winding voltage, where the winding voltage creates a flux that links to each phase of the electrical equipment. In yet another example, when the electrical equipment is a capacitor bank, the step of determining the processed voltage may be performed by determining a voltage across an equivalent capacitance for each phase of the electrical equipment.

According to an aspect a non-transitory computer readable medium containing program instruction that, when executed, causes the processor to perform the method 600 for determining an electrical making instant of a switching device for monitoring an energization operation of an electrical equipment may be provided.

The present subject matter thus provides a fast and accurate method to detect electrical making instants for coupled loads for monitoring the energization operation of the coupled load.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. A method comprising:
    obtaining a measured terminal voltage of each phase of one or more phases of an electrical equipment from a voltage measuring device, during an energization operation of the electrical equipment through a switching device, wherein the phases of the electrical equipment are electrically or magnetically coupled to each other;
    obtaining circuit configuration parameters associated with the electrical equipment;
    determining a processed voltage for the one or more phases of the electrical equipment based on one or more of the measured terminal voltages of the electrical equipment and a mapping table, wherein the mapping table comprises a mapping between the circuit configuration parameters and a computation to be performed on one or more of the measured terminal voltages; and determining an electrical making instant of a pole of the switching device associated with a phase of the one or more phases based on the processed voltage for monitoring the energization operation of the electrical equipment as an instant corresponding to a start of a rising slope of the processed voltage, when the rising slope crosses a pre-determined phase-wise threshold value to reach a first voltage peak.

2. The method as claimed in claim 1, wherein monitoring the energization operation of the electrical equipment comprises:
evaluating a making time based on the determined electrical making instant of the pole of the switching device during the energization operation;
comparing the making time with an expected making time for the circuit configuration parameters to determine an error; and
applying a correction to a closing time of the pole of the switching device based on the determined error to improve performance of a subsequent energization operation.

3. The method as claimed in claim 1, wherein when the electrical equipment is inductive having a magnetic circuit, the step of determining the processed voltage comprises determining a winding voltage, wherein the winding voltage creates a flux that links to each phase of the electrical equipment.

4. The method as claimed in claim 1, wherein when the electrical equipment is a capacitor bank, the step of determining the processed voltage comprises determining a voltage across an equivalent capacitance for each phase of the electrical equipment.

5. The method as claimed in claim 1, wherein the voltage measuring device is connected on a load side of the switching device.

6. The method as claimed in claim 1, wherein the pre-determined phase-wise threshold value corresponds to one or more of a noise, an interference, or a sub-property of the electrical equipment.

7. The method as claimed in claim 1, wherein the circuit configuration parameters comprise one or more of a connection configuration of a voltage measuring device, a position of the voltage measuring device, a type of the voltage measuring device, design characteristics of the electrical equipment, number of windings and their connection configuration, a type of winding configuration on which a controlled switching is performed, and a switching sequence of the electrical equipment.

8. The method as claimed in claim 1, wherein the measured terminal voltage of any one phase of the one or more phases or any two phases of the one or more phases is used to determine the processed voltage to detect the electrical making instant of the pole of the switching device associated with any other phase of the one or more phases based on the mapping table.

9. The method as claimed in claim 1, wherein the electrical equipment is any one of a transformer, a delta connected or ungrounded capacitor bank, a delta connected or ungrounded non-magnetically coupled reactor, or a magnetically coupled reactor.

10. A device connected to a switching device and comprising a processor, wherein the processor is configured to:
obtain a measured terminal voltage of each phase of one or more phases of an electrical equipment from a voltage measuring device, during an energization operation of the electrical equipment through the switching device, wherein the phases of the electrical equipment are electrically or magnetically coupled to each other;
obtain circuit configuration parameters associated with the electrical equipment;
determine a processed voltage for the one or more phases of the electrical equipment based on one or more of the measured terminal voltages of the electrical equipment and a mapping table, wherein the mapping table comprises a mapping between the circuit configuration parameters and a computation to be performed on one or more of the measured terminal voltages; and
determine an electrical making instant of a pole of the switching device associated with a phase of the one or more phases based on the processed voltage for monitoring energization operation of the electrical equipment as an instant corresponding to a start of a rising slope of the processed voltage, when the rising slope crosses a pre-determined phase-wise threshold value to reach a first voltage peak.

11. The device as claimed in claim 10, wherein for monitoring the energization operation of the electrical equipment, the processor is configured to:
evaluate a making time based on the electrical making instant of the pole of the switching device during the energization operation;
compare the making time with an expected making time for the circuit configuration parameters to determine an error; and
apply a correction to a closing time of the pole of the switching device based on the error to improve performance of a subsequent energization operation.

12. The device as claimed in claim 10, wherein
when the electrical equipment is inductive having a magnetic circuit, the processor is to determine the processed voltage by determining a winding voltage, wherein the winding voltage creates a flux that links to each phase of the electrical equipment; and
when the electrical equipment is a capacitor bank, the processor is to determine the processed voltage by determining a voltage across an equivalent capacitance for each phase of the electrical equipment.

13. The device as claimed in claim 10,
wherein the pre-determined phase-wise threshold value corresponds to one or more of a noise, an interference, or a sub-property of the electrical equipment.

14. The device as claimed in claim 10, wherein
the circuit configuration parameters comprise one or more of a connection configuration of a voltage measuring device, a position of the voltage measuring device, a type of the voltage measuring device, design characteristics of the electrical equipment, number of windings and their connection configuration, a type of winding configuration on which a controlled switching is performed, and a switching sequence of the electrical equipment; and
the electrical equipment is any one of a transformer, a delta connected or ungrounded capacitor bank, a delta connected or ungrounded non-magnetically coupled reactor, or a magnetically coupled reactor.

* * * * *